(12) United States Patent
Gilbert et al.

(10) Patent No.: US 12,659,414 B2
(45) Date of Patent: Jun. 16, 2026

(54) SYSTEMS AND METHODS FOR THE GENERATION AND USAGE OF AUTHENTICATION IMAGES IN CONJUNCTION WITH LOW-RESOLUTION PRINT DEVICES

(71) Applicant: Proof Authentication Corporation, Rochester, NY (US)

(72) Inventors: James P. Gilbert, Newton, MA (US); Daniel J. McKinnon, Wayland, MA (US); Richard Parrinello, Jr., Victor, NY (US); William Valincourt, Rochester, NY (US); David Wicker, Dansville, NY (US)

(73) Assignee: PROOF AUTHENTICATION CORPORATION, Rochester, NY (US)

( * ) Notice: Subject to any disclaimer, the term of this patent is extended or adjusted under 35 U.S.C. 154(b) by 350 days.

(21) Appl. No.: 18/365,026

(22) Filed: Aug. 3, 2023

(65) Prior Publication Data

US 2024/0048662 A1 Feb. 8, 2024

Related U.S. Application Data

(60) Provisional application No. 63/395,483, filed on Aug. 5, 2022.

(51) Int. Cl.
 *H04N 1/00* (2006.01)
 *G06K 15/00* (2006.01)
 *G06K 15/02* (2006.01)

(52) U.S. Cl.
 CPC ..... *H04N 1/00872* (2013.01); *G06K 15/1848* (2013.01); *G06K 15/1868* (2013.01);
 (Continued)

(58) Field of Classification Search
 CPC ........... H04N 1/00872; G06K 15/1848; G06K 15/1868; G06K 15/1872; G06K 15/189; G06K 15/4095
 See application file for complete search history.

(56) References Cited

U.S. PATENT DOCUMENTS

| | | | |
|---|---|---|---|
| 6,414,757 B1 | 7/2002 | Salem | |
| 10,812,675 B1 | 10/2020 | Chapman | |
| (Continued) | | | |

FOREIGN PATENT DOCUMENTS

| | | | |
|---|---|---|---|
| CN | 102411697 A | 4/2012 | |
| CN | 102800044 A | 11/2012 | |
| (Continued) | | | |

OTHER PUBLICATIONS

NPL: Results Publication Date Range: Jun. 3, 1997 to Jun. 20, 2025.*

(Continued)

*Primary Examiner* — Quang N Vo
(74) *Attorney, Agent, or Firm* — Orrick, Herrington & Sutcliffe LLP

(57) ABSTRACT

Systems and methods applicable, for instance, to the generation and usage of authentication images. In one aspect, unauthorized attempts to duplicate authentication images can be thwarted. In another aspect, there can be provision for authorized authentication image generation using low-resolution print devices.

23 Claims, 21 Drawing Sheets
(14 of 21 Drawing Sheet(s) Filed in Color)

(52) U.S. Cl.
CPC ....... *G06K 15/1872* (2013.01); *G06K 15/189*
(2013.01); *G06K 15/4095* (2013.01)

(56) References Cited

U.S. PATENT DOCUMENTS

| | | | |
|---|---|---|---|
| 10,825,123 B2 | 11/2020 | Rambler et al. | |
| 11,037,213 B2 | 6/2021 | Wu et al. | |
| 11,279,164 B1 | 3/2022 | Hsu et al. | |
| 11,317,001 B2 | 4/2022 | Oh et al. | |
| 2006/0284411 A1 | 12/2006 | Wu | |
| 2009/0244641 A1 | 10/2009 | Wu | |
| 2013/0335784 A1 | 12/2013 | Kurtz et al. | |
| 2014/0334665 A1 | 11/2014 | Quinn et al. | |
| 2016/0026904 A1* | 1/2016 | Hosaka | G06K 15/1872 |
| | | | 358/1.2 |
| 2019/0311240 A1* | 10/2019 | Wicker | G07D 7/202 |
| 2021/0206193 A1 | 7/2021 | Jones et al. | |
| 2022/0032669 A1 | 2/2022 | Rowe et al. | |

FOREIGN PATENT DOCUMENTS

| | | |
|---|---|---|
| EP | 1142190 | 10/2001 |
| EP | 3460766 A1 | 3/2019 |
| JP | 2021030730 A | 3/2021 |

OTHER PUBLICATIONS

International Search Report and Written Opinion in PCT/US2023/071609, mailed Dec. 1, 2023, 15 pages.

* cited by examiner

403

401

601

1103

1101

1803

1801

1905

1903

1901

2005

2003

2001

SYSTEMS AND METHODS FOR THE GENERATION AND USAGE OF AUTHENTICATION IMAGES IN CONJUNCTION WITH LOW-RESOLUTION PRINT DEVICES

CROSS-REFERENCE TO RELATED APPLICATIONS

This application claims priority to U.S. Provisional Application Ser. No. 63/395,483, filed Aug. 5, 2022, the contents of which are hereby incorporated by reference in their entirety and for all purposes.

FIELD OF THE INVENTION

The present disclosure relates generally to authentication images, and more specifically, but not exclusively, to systems and methods for the generation and usage of authentication images in conjunction with low-resolution print devices (e.g., home/office printers and low-resolution industrial printers).

BACKGROUND OF THE INVENTION

Authentication images can serve many useful purposes. For example, an authentication image affixed to an item (and/or to packaging materials thereof) can serve to indicate that the item is genuine. Such authentication image usage can be particularly useful in connection with items that are often the target of counterfeiters. Aircraft parts, pharmaceuticals, sports memorabilia items, luxury watches, and designer handbags are but a few of the items that fall into such a category.

However, where authentication images are used in this way, the authentication images themselves can be the subject of unauthorized duplication. Indeed, a counterfeiter could potentially lend credence to a counterfeit item by affixing to it a counterfeit authentication image. Here, increases in the capabilities of low-resolution print devices (e.g., home/office printers and low-resolution industrial printers) and of home/office capture equipment—along with decreases in the prices thereof—have served to make potential tools for the unauthorized duplication of authentication images readily available.

From a different vantage point though, allowing for the authorized printing of an authentication image using a low-resolution print device could prove useful under various circumstances. However, conventional approaches do not provide for authentication image generation that can on one hand be successfully performed by a low-resolution print device when authorized. But, on the other, hand that yields an authentication image that cannot be the subject of unauthorized duplication using, say, a home/office scanner in conjunction with a low-resolution print device.

In view of the foregoing, a need exists for improved systems and methods for implementing authentication images, in an effort to overcome the aforementioned obstacles and deficiencies of conventional approaches.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
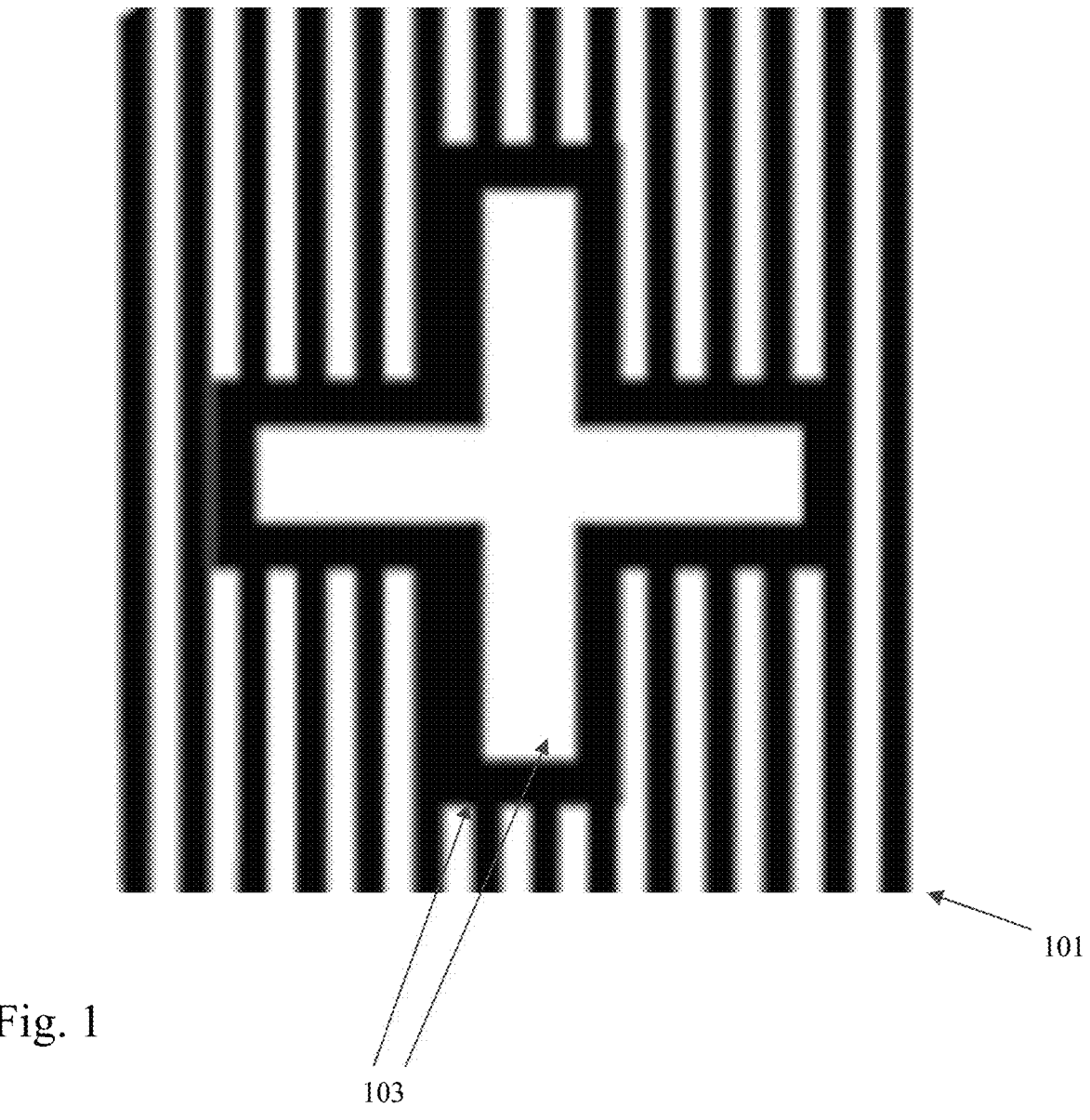
FIG. 1 is an illustration showing an authentication image including a visible target, according to various embodiments.

According to various embodiments, systems and methods can be employed to generate and utilize authentication images. Such an authentication image can be made up of one or more latent images, and one or more background images. As just some examples, the one or more latent images can serve functions including but not limited to demonstrating an item to which the authentication image is affixed or emblazoned to be an original or authentic item, and/or granting a privilege (e.g., access to a museum, concert, or sporting event). The one or more background images can, as just some examples, serve to camouflage the one or more latent images to the human eye, and/or to thwart attempts to duplicate the authentication image. Such thwarting can arise from the authentication image generation approaches leveraging inadequacies and/or idiosyncrasies of equipment (e.g., home/office scanners, copiers, smartphone cameras, stand-alone digital cameras, home/office printers, and/or low-resolution industrial printers) that could be plied by individuals endeavoring to reproduce the authentication image. Where such unauthorized reproduction is attempted, the result can be an image distinguishable from the original authentication image, thus signaling a non-original authentication image. Still, despite the camouflage and duplication-thwarting abilities of the background images, the one or more latent images of the authentication image can nevertheless be extracted using a camera-equipped smartphone (or other device). Further, in various embodiments a visible target (e.g., a plus-shaped visible target) can be located in or adjacent to the authentication image. The visible target can provide benefits including aiding in performing extraction of the latent images from the authentication image.

In various embodiments, the one or more background images and the one or more latent images of an authentication image can be formulated using sets of image elements. The image elements of a given set can share a given angular arrangement, and can formulate either a background image (or a portion thereof) or a latent image (or a portion thereof). As just an illustration, an authentication image can be made up of image elements that are arranged at or near 90 degrees and which form a background image, and image elements that are arranged at or near 45 degrees and which form a latent image. Here, authorized software (e.g., an authorized app running on a smartphone and/or software running on a central computer or website) can utilize knowledge of the 90 degree angular arrangement of the image elements that make up the background image, and of the 45 degree angular arrangement of the image elements that make up the latent image, to subtract the background image from the authentication image, thereby yielding the latent image. As just some examples, the image elements can be lines, line segments, dots, spots, or non-imaged areas (e.g., white spaces). The image elements can be straight, intermittent, modulated (e.g., wavy and/or thickness/thinness modulated), and/or contain noise. The image elements can be of various shapes. As just some examples, the dots can be circular, the dots can be square, the non-images areas can be circular, and/or the non-imaged areas can be square.

In various embodiments a latent image can consist of image elements that are situated in between (or adjacent to) image elements that are spaced at or about 150 to at or about 300 lines per inch. In other embodiments, other lines per inch spacing ranges than at or about 70 to at or about 300 lines per inch can be used. Also, in various embodiments, background images can be situated around and/or integrated with latent images.

Authentication images and visible targets can be printed, as just some examples, utilizing traditional presses, digital presses, laser printers, using inkjet printers, using split fountain methods, using simulated split fountain methods, and/or via laser etching. Further, authentication images and visible targets can be single or multicolor. The printing can, in various embodiments, be over one or more substrates, such as white and/or toned substrates. Authentication images and visible targets can be printed via bitmap approaches and/or via custom font/character set approaches. Custom font/character set approaches are discussed in greater detail hereinbelow. Also, printing of authentication images and visible targets can be directed by computers including personal computers, factory computers, and smartphones. Where, for example, a smartphone is used, an app running on the smartphone can receive data utilizable for printing an authentication image and/or visible target from a central computer or website.

As an example, an authentication image can include image elements that are arranged at or near 90 degrees (or 0 degrees) and which form a background image, and image elements that are arranged at or near 45 degrees and which form a latent image. Here, the at or near 90 degree (or 0 degree) background image can yield benefits including: a) camouflaging the latent image; b) creating distortions that carry over the latent image; c) making the latent image not visible to the human eye, a scanning device, or a camera; and d) causing attempts to capture (e.g., via scanner or smartphone camera) the image elements to fail, resulting in the capture of an image with fewer than the intended image elements (or different than the intended image elements), thus signaling a non-original authentication image. In this example, image elements for the background image are arranged at or near 90 degrees (or 0 degrees), and image elements for the latent image are arranged at or near 45 degrees. However, in various embodiments other values can be used for the two angles. Also, in this example the authentication image includes a single latent image. However, in various embodiments the authentication image can include several latent images. The several latent images can, as one example, have their image elements arranged at the same degree value (e.g., there can be two latent images, each made up of image elements arranged at or near 45 degrees). As another example, one or more of the several latent images can have their image elements arranged at different degree values (e.g., there can be two latent images, with the first made up of image elements arranged at or near 45 degrees, and the second made up of image elements arranged at a different degree value). In various embodiments, where multiple latent images are employed, one or more of the latent images can be split apart in their color makeup (e.g., such that one or more sections thereof appear in two or more colors).

As another example, an authentication image can include: a) image elements that are arranged at or near 45 degrees and which form a first background image; b) image elements that are arranged at or near 90 (or 0 degrees) degrees and which form a second background image; and c) image elements that are arranged at or near 135 degrees and which form a latent image. Here, the at or near 45 degree first background image and the at or near 90 degree (or 0 degrees) second background image can yield benefits including those noted above (e.g., making the latent image not visible to the human eye, a scanning device, or a camera). In this example, image elements for the first background image are arranged at or near 45 degrees, image elements for the second background image are arranged at or near 90 degrees (or 0 degrees), and image elements for the latent image are arranged at or near 135 degrees. However, in various embodiments other values can be used for the three angles. Also, in this example the authentication image includes a single latent image. However, in various embodiments the authentication image can, in a manner analogous to that discussed above, include several latent images. Accordingly, as just one example, there can be two latent images, each made up of image elements arranged at or near 135 degrees. Further accordingly, as just another example, there can be two latent images, with the first made up of image elements arranged at or near 135 degrees, and the second made up of image elements arranged at a different degree value.

Although authentication images have been discussed herein as being made up of one or more latent images and one or more background images, other possibilities exist for applying the approaches discussed herein. For example, authentication images can, as an alternative to or in addition to including one or more background images, include one or more graphic overlays. Such graphic overlays can be implemented in a manner generally analogous to that discussed herein with respect to background images. However, in various embodiments background images can be situated behind latent images graphic overlays can be situated in front of latent images.

In various embodiments, a visible target can be located in or adjacent to an authentication image. A visible target can, as just some examples, aid in the detection, filtration, and/or decoding of a corresponding authentication image. As just some further examples, a visible target can assist in functions, such as glare detection and automatic zooming, that can make use of the location of the visible target. A visible target can, as just some examples, make use of black and white, colors, and/or pairings of high-contrast colors.

A visible target, which can also be referred to as a proof locator, can, as just an example, be a plus-shaped image. Further, the visible target can have one or more distinct attributes. In various embodiments, these district attributes can be known to software running on a camera-equipped smartphone (or other device) that is to perform extraction (or other operations). These extraction operations (or other operations) can include operations performed with respect to an authentication image to which the visible target corresponds. Such knowledge can assist the software in performing the extraction (or other operations). The distinct attributes can, as just some examples, include one or more of: a) size of the visible target relative to the corresponding authentication image; b) position of the visible target in or adjacent to the corresponding authentication image; c) a distinct and/or specific white space configuration of the visible target; and d) a distinct and/or specific width of an outlined rule of the visible target. Various colors can be used for the outlined rule. For instance, the outlined rule can be black. Shown in FIG. 1 is a zoomed-in view of a visible target 103 of an example authentication image 101.

A visible target can take the geometric form of a plus shape. Such plus shape can, for instance be a cross with four arms of equal (or near equal) length. The use of a plus shape for the visible target can yield benefits including balance of simplicity and distinction. For instance, because the plus shape is a simple and distinct shape it can be evaluated mathematically for fast performance when processing large amounts of contours extracted from a high-resolution camera image. Such operations and the capture of such an image can be performed, for instance, by a smartphone.

According to various embodiments, a smartphone (or other computer) can act to detect a visible target from a camera image by first performing a contour extraction operation on the image. Subsequently, the smartphone (or other computer) can, for each of some or all of the extracted contours, measure the distances of the points of that contour from the center of that contour. Where a given contour is a visible target, such distance from center point determination can yield a pattern indicative thereof. In various embodiments, when ascertaining a given contour to be a visible target, the smartphone (or other computer) can ascertain the location of the visible target contour within the image.

Figure 2:
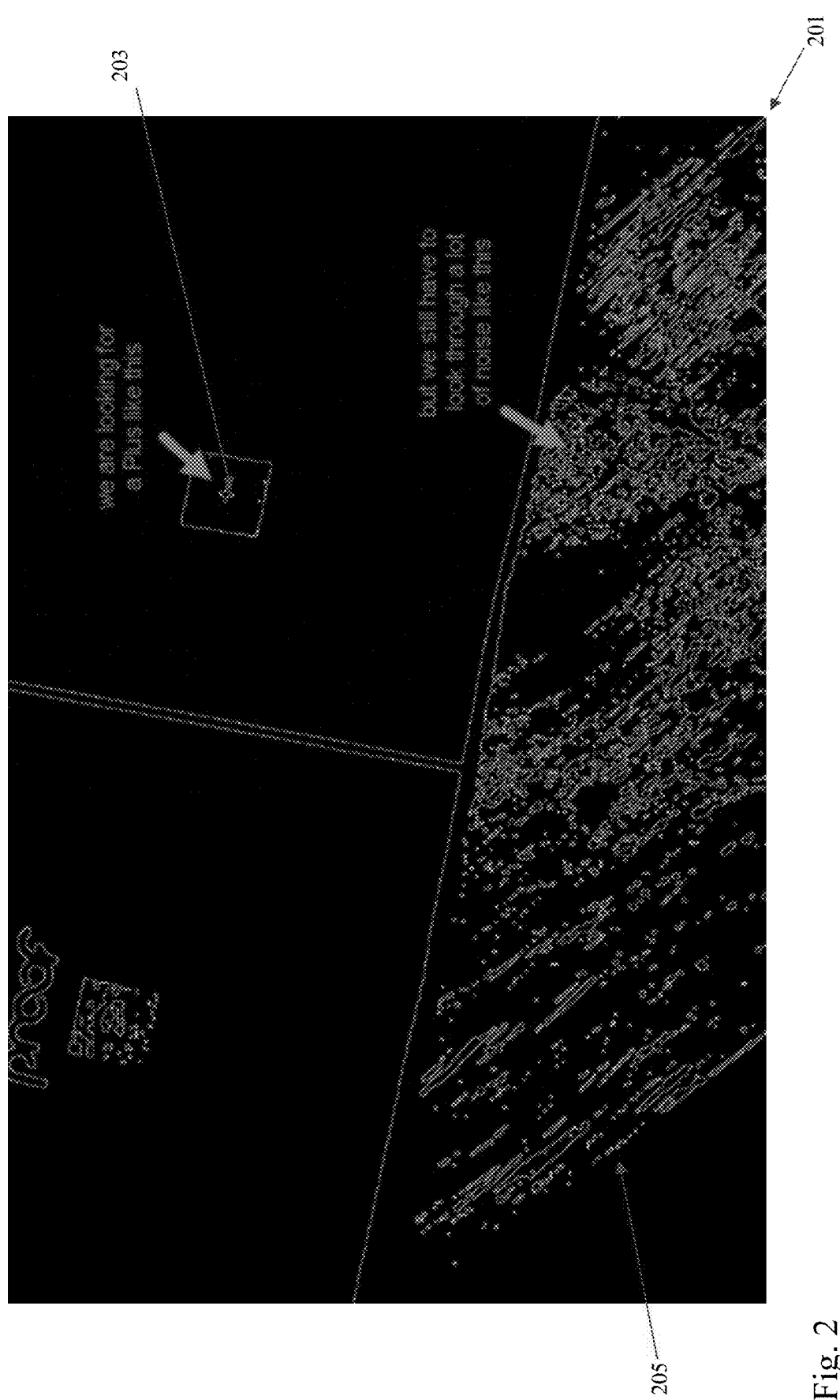
FIG. 2 is a representation of a computer having performed a contour extraction, according to various embodiments.

For example, shown in FIG. 2 is a representation 201 of a smartphone (or other computer) having performed such a contour extraction operation on an image (e.g., on a smart-

Figure 3:
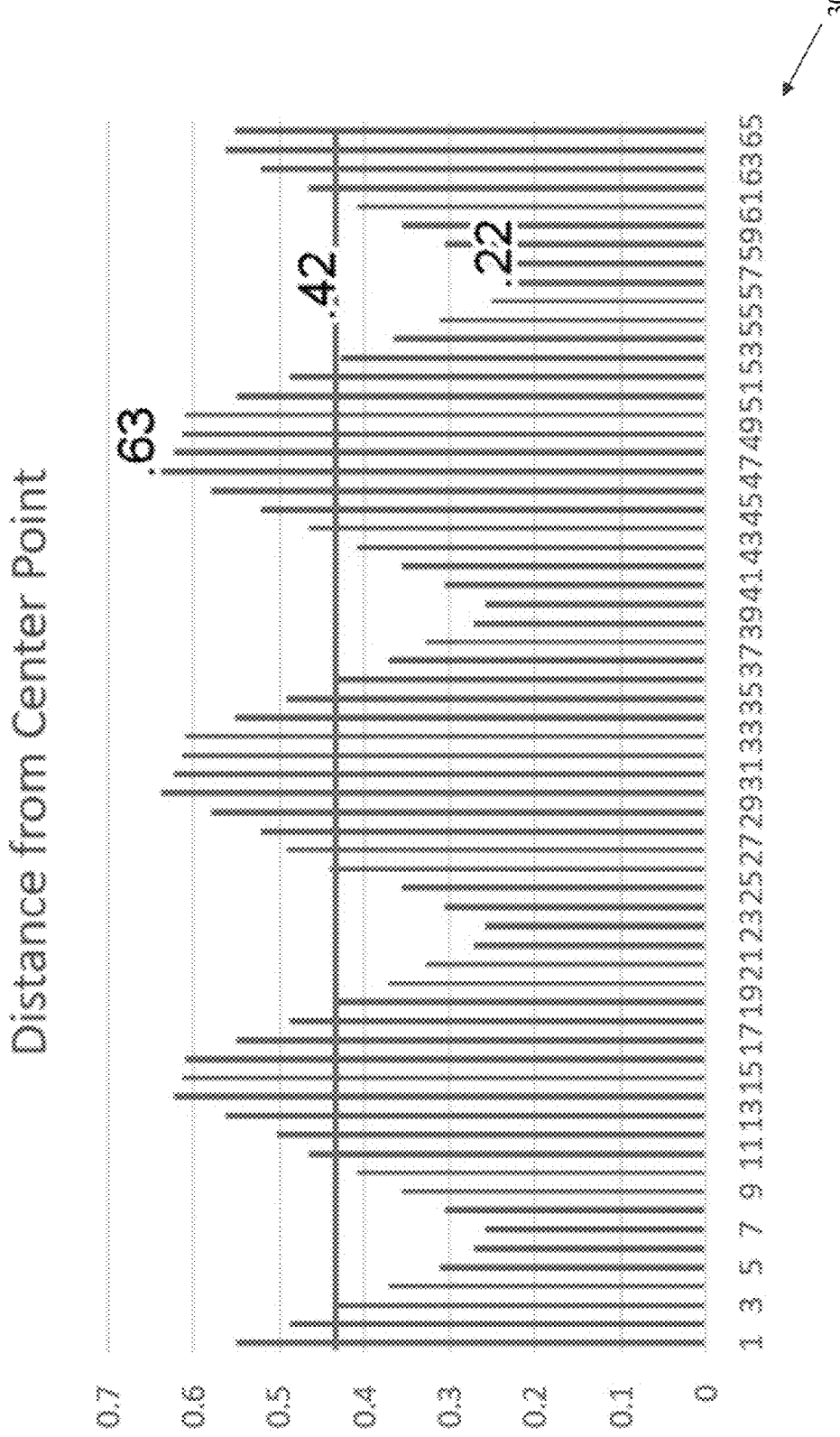
FIG. 3 is distance-from-center-point plot, according to various embodiments.

6 phone-captured image). As depicted by FIG. 2, the extracted contours include contour 203 corresponding to a visible target, and contours 205 corresponding to other than the visible target (e.g., contours corresponding to noise). Then, shown in FIG. 3 is a distance-from-center-point plot 301 for an extracted contour which corresponds to a visible target. Here, the plot exhibits a pattern indicative of the extracted contour corresponding to a plus-shaped visible target. With respect to FIG. 3, it is noted that the number of points that correspond to the plus-shaped visible target within the plot can vary. But, the plus-shaped visible target can nevertheless exhibit within the plot a pattern of four evenly distributed peaks and valleys. In various embodiments, evaluation of the peaks and valleys can be made by utilizing the halfway value between the minimum distance from the center to the maximum distance from the center.

As another example advantage of utilizing a plus-shaped visible target, such plus shape can retain detectable form down to a very small scale. As such, benefits such as providing a wider range of proximity in which to detect the visible target can accrue. Additionally, where a plus shape is used for the visible target, the uniformity of the arms of the plus can be used by the smartphone (or other computer) to determine the exterior points of the corresponding authentication image. These exterior points can, as just one example, be used in a reverse-transformation from perspective/3D space to 2D space. Once the smartphone (or other computer) has translated the authentication image in this way, the smartphone (or other computer) can apply filtration to enhance the information for readability. As yet another example advantage of utilizing a plus-shaped visible target, the discrete contrast offered by such a visible target's unprinted area outlined by the visible target's printed area can offer a device camera (e.g., a smartphone's camera) an optimal (or near-optimal) visual component to auto-focus on at a close distance from the visible target.

Once the smartphone (or other computer) has determined a given contour to be a visible target, and/or has determined the location of the visible target within the captured image, various supporting functions (e.g., supporting app functions) can be employed to aid one or more of: a) operations performed by the smartphone (or other computer) with respect to the authentication image (e.g., yielding a latent image from the authentication image); and/or b) user experience. One example supporting function is glare detection. Such glare detection can include identifying an intense (e.g., the most intense) point of brightness on the captured image in relation to the location of the visible target and a surmised area of the authentication image surrounding the visible target (e.g., surmised utilizing one or more of the above-noted distinct attributes of the visible target). Another example supporting function is an auto-zoom feature. Such auto-zoom feature can include increasing and/or decreasing camera zoom according to an optimal size (or near optimal size) for filtration, extraction, and/or decoding. Such zoom of the camera can be useful, for instance, for capturing small and/or dense information of an authentication image.

The combination of the inner white space of the visible target and the surrounding color of the visible target can, in various embodiments, provide a contrast basis with which the authentication image can be assessed by the smartphone (or other computer). As just an illustration, the center of the visible target being white, and/or the knock-out color of a corresponding print design, can provide a baseline color value with which to perform filtration (e.g., binary thresholding), and/or can be used when calculating various aspects of the authentication image (e.g., printed/unprinted ratio).

Figure 4:
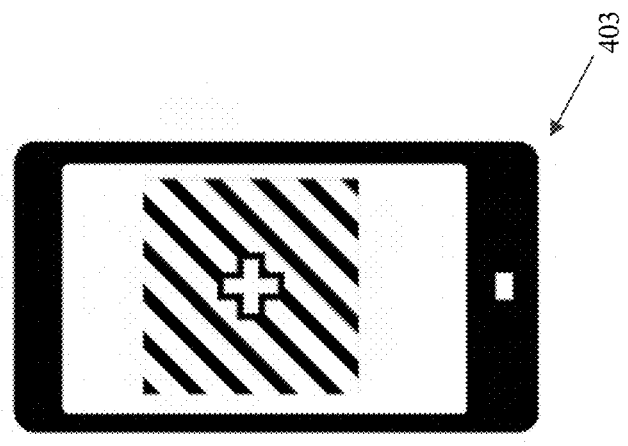
FIG. 4 is an illustration showing a QR code in comparison to an authentication image, according to various embodiments.
Figure 4:
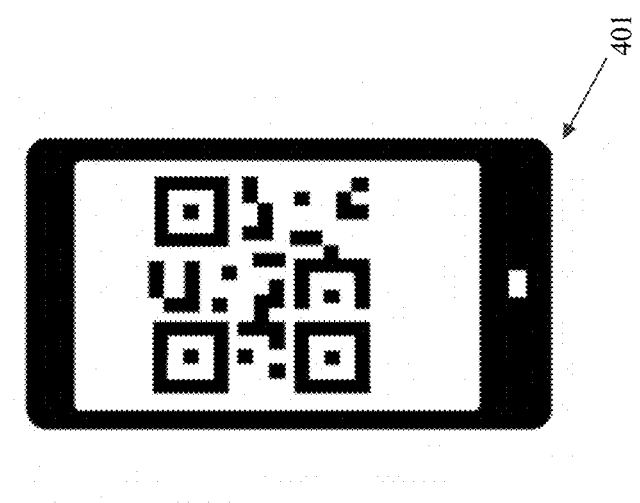

With reference to FIG. 4, it is noted that a further advantage of utilizing a plus shape for the visible target can include it having the potential for being visually recognizable and/or iconic, such as when the visible target is deployed in consumer-facing applications. For instance, consider that one of the most familiar consumer-oriented information marks is the QR code 401. The QR code has good recognizability to the public, with its iconic form of four blocky anchor points with one as an anchor. Then, further consider that the authentication image discussed herein (e.g., as depicted in FIG. 4 as authentication image 403): a) has the capability of printing much smaller than a QR code; and b) achieves its own iconic look with, in various embodiments, a plus-shaped visible target at its center. As such, the authentication image discussed herein has the potential for being at least as visually recognizable and/or iconic as the QR code, if not more so.

In some embodiments, an authentication image can be printed using a bitmap approach. In other embodiments, an authentication image can be printed using a custom font/character set approach. Such a custom font/character set approach can include, for example, formulating a custom font and/or character set made up of characters that each provide one or more image elements of the sort discussed herein, or portions thereof. Such a custom font/character set approach can be used both when printing authentication images that include visible targets of the sort discussed herein, and when printing authentication images that do not include visible targets. When such a custom font/character set approach is used in printing an authentication image that does include a visible target, the custom characters can be used both in printing the visible target component of the authentication image, and when printing other components of the authentication image. In some embodiments, a vector-based approach can be used in the creation of the custom font/character set. In other embodiments, a raster-based approach can be used in the creation of the custom font/character set. However, a vector-based approach can have a potential for yielding more consistent results than a raster-based approach.

Printing an authentication image using a custom font/character set approach can yield various advantages. For example, printing an authentication image in this way (e.g., when using a vector-based approach) does not require knowledge of printer resolution (or other printer specifics) in order to print authentication images across a variety of print devices. Another example advantage of printing an authentication image using a custom font/character set approach is that the number of lines per inch of the authentication image can be changed by changing the size of characters used to compose the authentication image.

Then, yet another example advantage of printing an authentication image using a custom font/character set approach is that of variability when creating the authentication image. In particular, because the authentication image can be composed of custom characters of the sort noted, there is not call that an individual bitmap be generated for each authentication image. Further in particular, because the authentication image can be composed of custom characters of the sort noted, authentication image creation using variable data can be performed (e.g., with the number of characters and/or their positions within the authentication image being variably printed). Additionally in particular, because the authentication image can be composed of custom characters of the sort noted, easier variability when incorporating background image camouflage features can be achieved (e.g., by variably printing the number of characters and/or positions of characters used to form the background image(s)).

Further, an additional example advantage of printing an authentication image using a custom font/character set approach is that of easier and/or faster authentication image generation (e.g., once the custom character set has been built, generation of an authentication image mainly calls for merely placing appropriate characters of the pre-built set). Yet another example advantage of printing an authentication image using a custom font/character set approach is that of flexibility in terms of authentication image structure. For instance, custom screening patterns can be used in creation of characters, including a variety of angle combinations and line thickness modulations. As such, screening options of characters can advantageously be not dependent on conventional screening. Custom screening patterns can, as just some examples, achieve not only efficient readability (e.g., when utilizing an app running on a smartphone), but also increased distortion when unauthorized duplication attempts are made.

Another example advantage of printing an authentication image using a custom font/character set approach is that the area of the authentication image can be increased. In particular, for instance, the use of a custom font/character set to composite an authentication image allows the location of the latent image portions thereof to be more readily ascertained.

Figure 5:
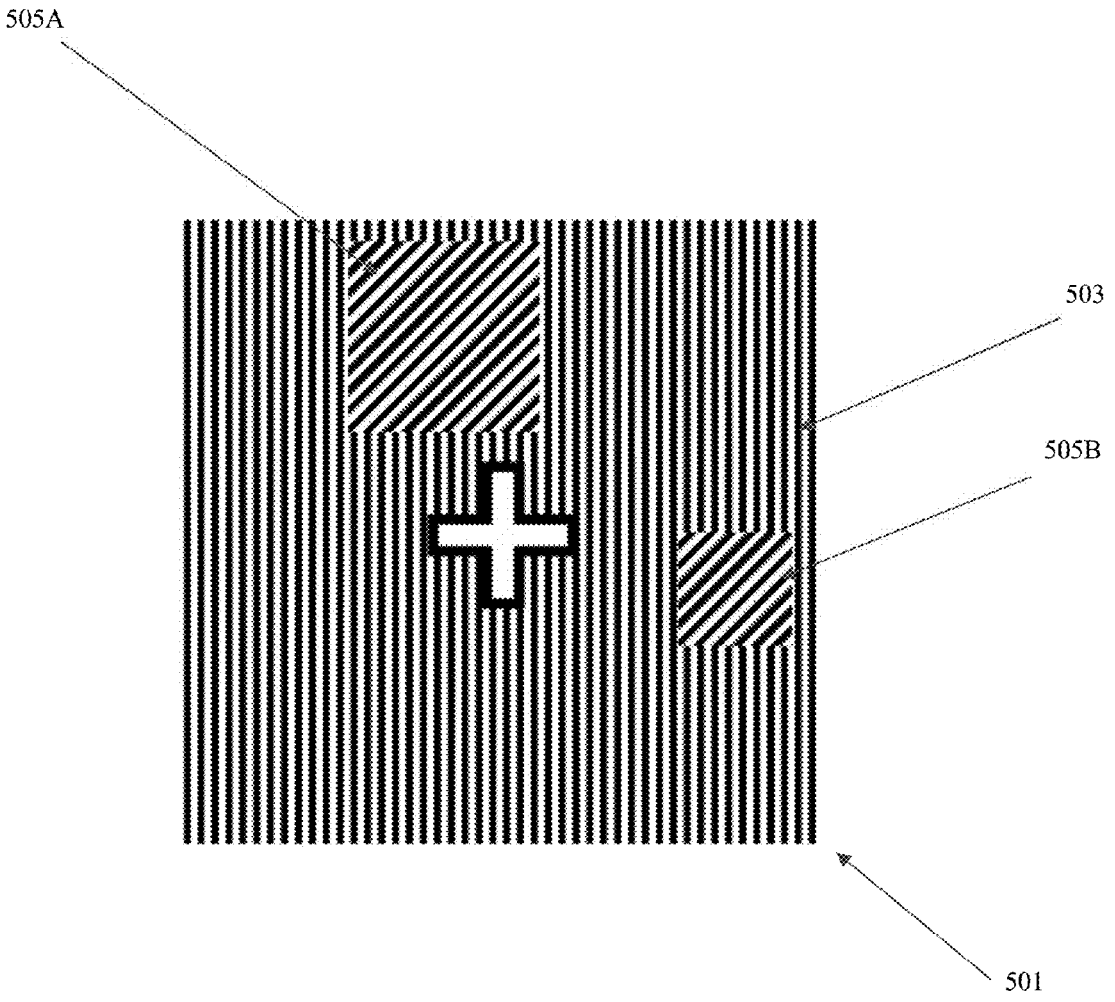
FIG. 5 is an illustration showing an authentication image including a background image and multiple latent images, according to various embodiments.
Figure 6:
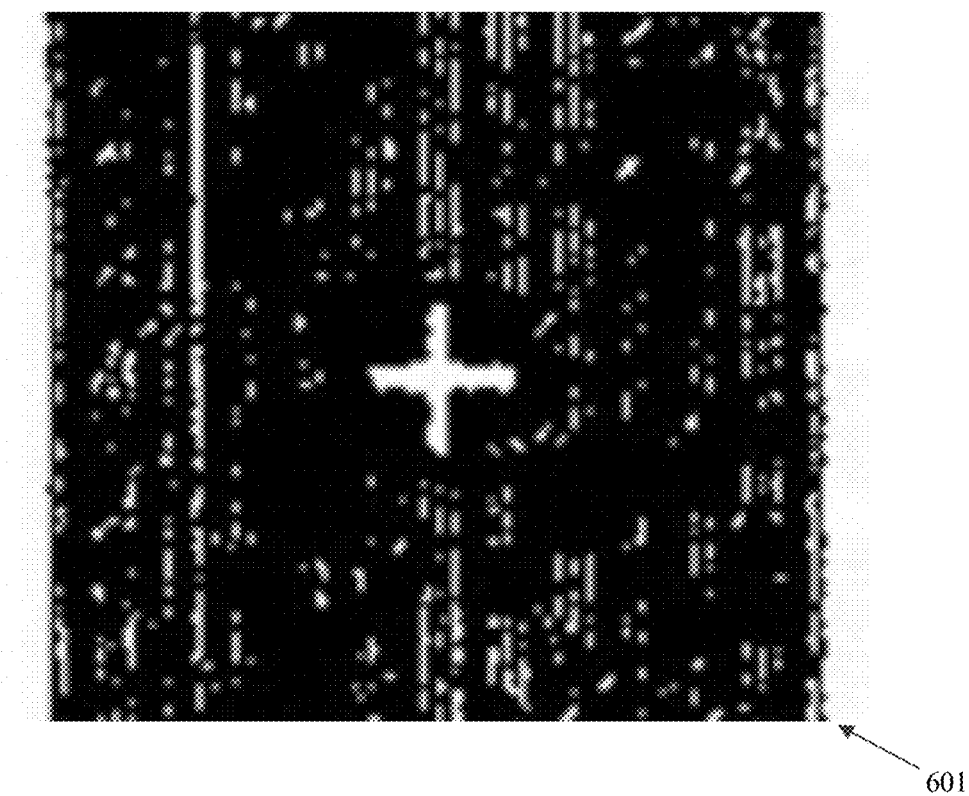
FIG. 6 is an illustration showing a thwarted attempt to duplicate an authentication image, according to various embodiments.

Shown in FIG. 5 is an example authentication image 501 including a background image 503 formed using image elements that are arranged at or near 90 degrees, and further including latent images 505A/505B formed using image elements that are arranged at or near 45 degrees. Then, shown in FIG. 6 is the result of a thwarted attempt to duplicate the authentication image of FIG. 5. Here, because of the authentication image approaches discussed herein, the attempt has failed, resulting in the capture of an image 601 with other than the intended image elements, thus signaling a non-original authentication image.

Also, an authentication image can be authenticated by analyzing the width/spacing (and/or angle) of the image elements that make up the authentication image. The analysis can be performed by authorized software (e.g., an authorized app running on a smartphone). As one example, the analysis can determine whether the width/spacing (and/or angle) of the image elements is consistent globally (or nearly consistent globally) throughout the authentication image. As another example, the analysis can determine whether the width/spacing (and/or angle) of the image elements exhibits regular variability globally (or near regular variability globally) throughout the authentication image. Here, the analysis can leverage inadequacies and/or idiosyncrasies of low-resolution print devices that would cause an unauthorized printing of a duplicated authentication image to not match an original of that authentication image in terms of image element width/spacing (and/or angle). Still, authorized printing of an authentication image by low-resolution print devices can be provided for by implementing approaches that compensate for the inadequacies and/or idiosyncrasies of these print devices. In this way, such low-resolution print devices can print authentication images exhibiting image element width/spacing (and/or angle) that satisfy the noted authentication analysis. It is noted that low-resolution print devices, as discussed hereinthroughout, can include home/office printers and low-resolution industrial printers.

Figure 7:
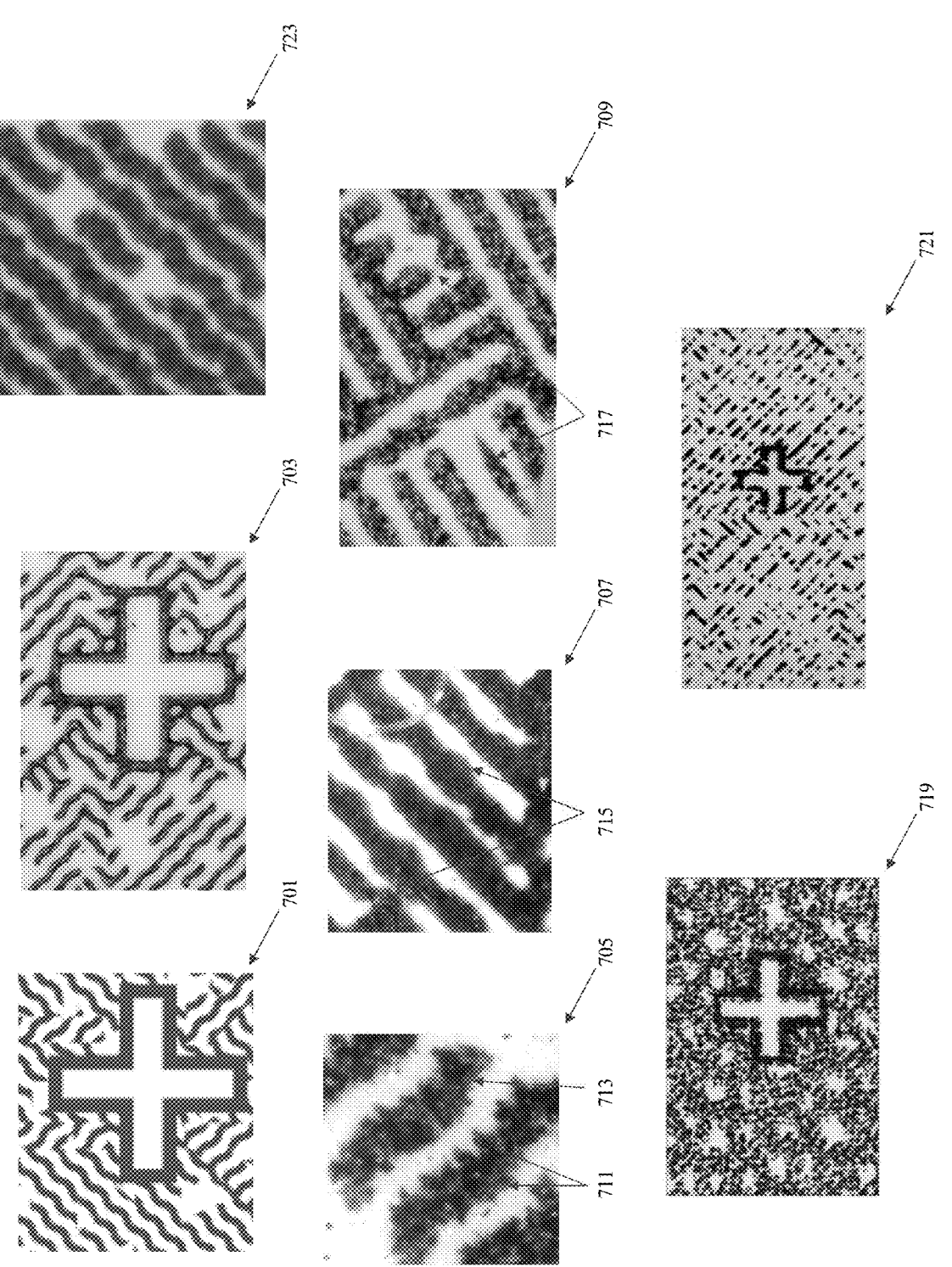
FIG. 7 is an illustration showing depictions of an uncompensated print file and various prints thereof, according to various embodiments.

Turning to FIG. 7, shown is a depiction of an uncompensated print file 701 for an authentication image. Also shown in FIG. 7 are: a) a depiction 703 of the uncompensated print file 701 as printed by a 2400 dpi flexographic printer; b) a zoom 705 of the uncompensated print file 701 as printed by a 600 dpi inkjet; c) a zoom 707 of the uncompensated print file 701 as printed by a 812 dpi liquid ink printer; and d) a zoom 709 of the uncompensated print file 701 as printed by a 600 dpi toner-based laser printer.

As shown by FIG. 7, when the uncompensated print file 701 is directly printed (i.e., rather than printed using a corresponding compensated print file as discussed hereinbelow) by the 600-dpi inkjet, the print result includes rough line edges 711 and bent lines 713. These rough line edges 711 and bent lines 713 cause the print result to not match the uncompensated print file 701 in terms of image element width/spacing (and/or angle) Likewise, when the uncompensated print file 701 is printed without compensation by the 812-dpi liquid ink printer, the print result includes oversize lines 715 that cause the print result to not match the uncompensated print file 701 in terms of image element width/spacing (and/or angle). Further, when the uncompensated print file 701 is printed without compensation by the 600-dpi toner-based laser printer, the print result includes missing line portions 717 that cause the print result to not match the uncompensated print file 701 in terms of image element width/spacing (and/or angle). Additionally shown in FIG. 7 are: a) a zoomed-out view 719 corresponding to zoom 705; and b) a depiction 721 of the uncompensated print file 701 as printed by a low-resolution (e.g., home/office) thermal printer. As depicted by the figure, such uncompensated prints deviate from uncompensated print file 701.

As referenced, the authorized printing of an authentication image by low-resolution print devices can be provided for. In particular, such can be achieved by generating a compensated print file from an uncompensated print file. Where, say, a low-resolution (e.g., home/office) 600-dpi inkjet printer prints an authentication image by way of such a compensated print file, the print result can match (or nearly match) a corresponding uncompensated print file, due to the compensated print file compensating for inadequacies and/or idiosyncrasies of the inkjet printer. As such, returning to the example of FIG. 7 the 600-dpi inkjet can generate a print result that matches (or nearly matches) flexographic print result 703, rather than the print result of zoom 705.

The generation of a compensated print file from an uncompensated print file can utilize one or more compensatory formulas and/or rules based on known idiosyncrasies/inadequacies of a given low-resolution print device. For instance, it can be known that the low-resolution print device incorrectly renders an uncompensated print file by weakening instances of a line being situated within a certain known distance range between two other lines. Here, the compensatory formulas and/or rules can thicken these line instances in the compensated print file in such a way that causes those line instances to, when printed, properly match the uncompensated print file.

With further regard to the formulas and/or rules, it is noted that the formulas and/or rules can dictate the thinning or thickening of printed lines, thereby allowing a low-resolution print device to generate a print result that can satisfy a smartphone app that captures (and determines the validity of) authentication images by considering print consistency of authentication image lines and angles. The formulas and/or rules can utilize various factors to determine how much to thin or thicken lines. As examples, these factors can include: a) print device type; b) print speed; c) print sheet width; d) ink cure and/or air dry time; e) colorant utilized (e.g., inkjet ink, traditional ink, liquid ink, and/or toner); f)

substrate utilized (e.g., traditional paper, inkjet receptive paper, metal, and/or plastic); and/or varnish and/or aqueous coatings utilized. As just an illustration, the plastic can be a plastic bag material such as LDPE.

As referenced above, in various embodiments an authentication image can be printed using a custom font/character set approach. Further, such a custom font/character set approach can be used when generating compensated and/or uncompensated print files. For instance, the use of a vector art file based on a custom font/character set can allow a consistent line shape to be retained throughout plating and/or printing processes, via an outlined print file that accomplishes consistent printing without regard to print device dpi.

Where an uncompensated print file is printed by a low-resolution print device, the ensuing print result can exhibit various flaws (e.g., large amounts of spatter and/or unevenness on line edges). Due to these flaws, the ensuing print result can be expected to not scan (or not consistently scan) as valid with a phone app. In various embodiments, the establishment of compensatory formulas and/or rules can involve utilizing an automated process that works backwards. In these embodiments, image element width/spacing (and/or angle) can initially be created in an original, uncompensated print file. Subsequently, operations can be performed to establish compensatory formulas and/or rules applicable to generate a final, compensated print file. Working backwards can include using an automated process that measures, in a print result arising from a low-resolution print device directly printing an uncompensated print file, aspects such as intensity of the colorant splatter. As examples, such colorant splatter can occur from colorant overspray, substrate absorption, wicking, and/or incomplete ink adherence.

Specifically, the establishment of the compensatory formulas and/or rules can seek to yield a compensated print file that, when printed by a low-resolution print device under consideration, satisfies two criteria. Firstly, that printing of the compensated print file by the low-resolution print device yields an authentication image that stays clean enough (e.g., in terms of white space percentage to black image percentage ratio) to scan (and/or consistently scan) as valid with a smartphone app. And, secondly, that if an unauthorized attempt is made to duplicate (e.g., using a home/office copier or desktop scanner) the print result arising from the printing of the compensated print file, that such duplication will fail, with interference and/or image loss ensuing. In particular, the failure can be such that the authentication image will not scan (and/or will not consistently scan) as valid with the phone app. In this way, presentation of a non-genuine authentication image can be signaled.

Returning to FIG. 7, also depicted is a zoom 723 of a compensated print file as printed by the 600-dpi toner-based laser printer. Here, the compensated print file corresponds to the uncompensated print file 701. It is observed that, due to the use of the compensated print file, the zoom 723 does not exhibit the missing line portions 717 of the zoom 709.

The discussed use of compensated print files can yield various benefits. For example, according to conventional approaches low-resolution print devices have not been considered to be capable of being used for security printing due to failings including their low dpis and their print processes. In particular, according to conventional approaches on order of 2400 dpi has been considered to be the minimum dpi necessary to perform security printing. For perspective, it is noted that digital/thermal ink presses exhibit dpi capabilities ranging from on order of 203 dpi to on order of 812 dpi. However, via the discussed use of compensated print files, low-resolution print devices (e.g., low-resolution industrial printers, desktop printers, toner-based printers, digital inkjet presses, and pad printing presses) can be used for security printing (e.g., allowing for home printing of a theater ticket that includes an authentication image). Beyond allowing security printing to be performed using low-resolution print devices conventionality considered incapable of that task, as another example benefit via the discussed use of compensated print files various colorants (e.g., home/office colorants and colorants used in conjunction with low-resolution industrial printers) conventionality considered incapable of being used for security printing (e.g., due to the splatter that they exhibit) can be used. In this way the use of such colorants (e.g., inkjet fluids, toner, and liquid inks) can be enabled, where intaglio, flexographic, and/or offset inks were traditionally thought required. As a further example benefit, via the discussed use of compensated print files various substrates (e.g., home/office substrates and substrates used in conjunction with low-resolution industrial printers) conventionality considered incapable of being used for security printing (e.g., due to their absorption characteristics) can be used for this purpose. As just some examples, such substrates can include thermal print papers, fabrics, polyesters, rough/coarse surfaced substrates, and/or porous surfaced substrates. Traditionally, low resolution printers (especially desktop units) have been excluded from printing security features because of their inability to accurately produce a consistent, effective, smartphone authenticatable image. However, via the discussed use of compensated print files this limitation can be overcome. More generally, the functionality discussed herein can yield an authentication image that contains image elements that affect the consistency of print colorant applied to and/or absorbed by a substrate such that: a) unauthorized copying of the authentication image is impeded; and b) analysis software (e.g., running on a smartphone) can determine that the authentication image is not genuine, and can signal such to a user. The configuration of such image elements can be termed intentional spacing.

Figure 8:
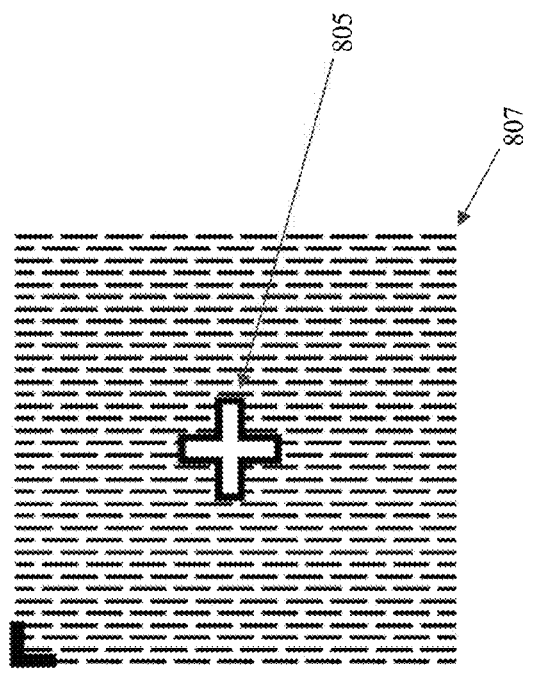
FIG. 8 is an illustration showing further authentication images including visible targets, according to various embodiments.
Figure 8:
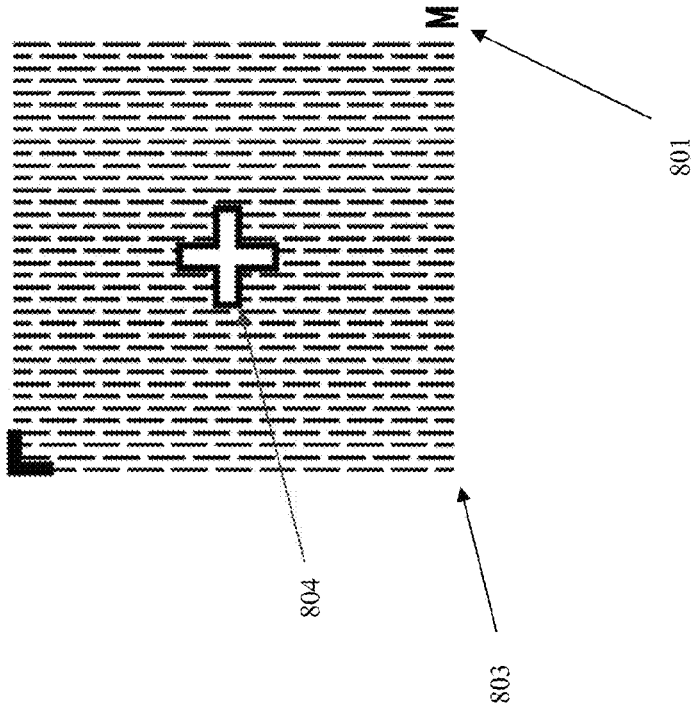

As discussed above, in various embodiments a visible target can be located in or adjacent to the authentication image. Shown in FIG. 8 is a visible target 801 that is situated adjacent to (and in particular adjacent and at a corner of) an authentication image 803. According to the example of FIG. 8, the visible target 801 takes the form of a character, in particular the letter "M." Additionally shown in FIG. 8 is a visible target 805 that is situated in an authentication image 807. According to the example of FIG. 8, the visible target 805 takes the form of a plus shape. The use of a visible target can yield benefits including aiding the ability of a smartphone (or other capture device) to locate, orient, focus, detect glare and/or adjust captured image contrast levels. Still further shown in FIG. 8 is a visible target 804 that is situated in the authentication image 803.

Figure 9:
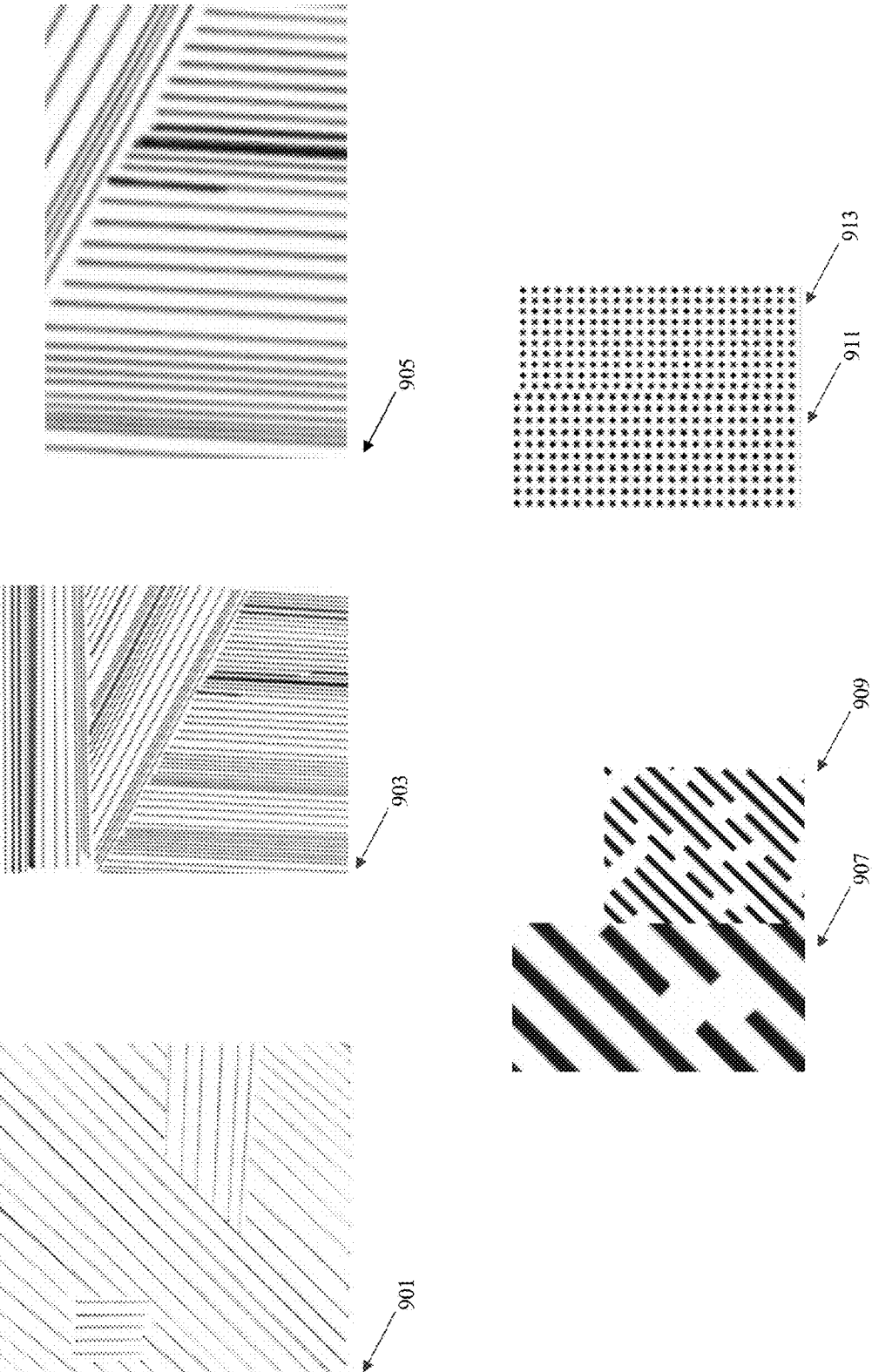
FIG. 9 is an illustration showing consistent image elements and variable image elements, according to various embodiments.

As discussed, authentication of an authentication image can include determining whether image element width/spacing (and/or angle) is consistent globally throughout an authentication image. As also discussed, such authentication can include determining whether image element width/spacing (and/or angle) exhibits regular variability globally throughout an authentication image. Shown in FIG. 9 is an example authentication image 901 in which the width and spacing of both print and white space is consistent globally throughout authentication image 901. In this way, the consistency of the width and spacing of the image elements of authentication image 901 lends itself to on one hand authenticity determination, and on the other hand to destruction of a duplicated authentication image. Then, also shown in FIG. 9 is an example authentication image 903 in which the width, spacing, and angle of image elements varies globally throughout authentication image 903. Here, the variability of the width, spacing, and angle of the image elements of authentication image 903 lends itself to on one hand authenticity determination and on the other hand to destruction of a duplicated authentication image. Additionally shown in FIG. 9 is a zoom 905 of authentication image 903.

With further regard to the discussed variability, it is noted that the relation of any image element to any other image element can be variable within an authentication image. In this regard, shown in FIG. 9 is an example of image elements 907 being variable within an authentication image to image elements 909. Also in this regard, shown in FIG. 9 is a further example of image elements 911 being variable within an authentication image to image elements 913.

Figure 10:
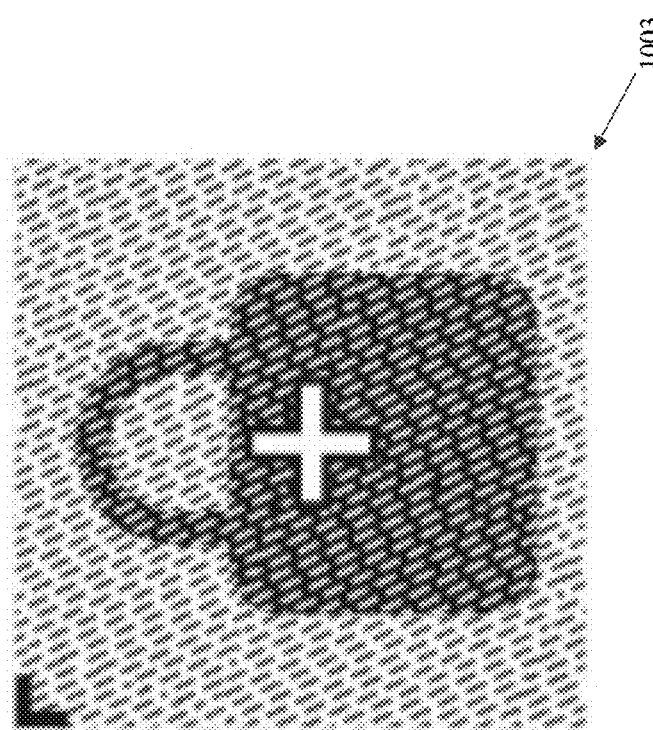
FIG. 10 is an illustration showing depictions of authentication images including visible images, according to various embodiments.
Figure 10:
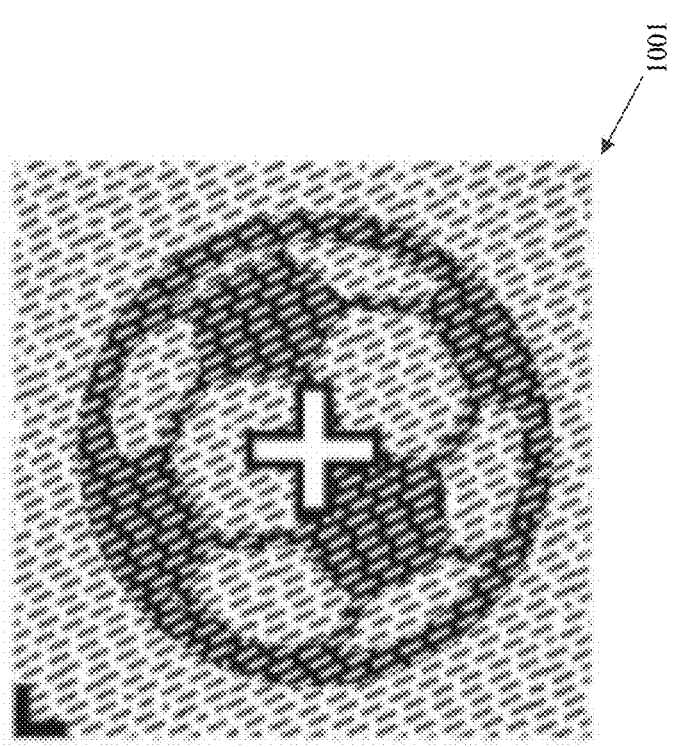

An authentication image can include a visible graphic (e.g., visible to the naked eye). In particular, various properties of image elements of the authentication image can be variable and integrated throughout the authentication image so as to create the visible graphic. The visible graphic can, for instance, be a logo, an emblem, a design, or a trademark. Shown in FIG. 10 is an example authentication image that includes a soccer ball visible image 1001. The soccer ball visible image 1001 arises from the noted application of image elements. Also shown in FIG. 10 is an example authentication image that includes a lock visible image 1003 that arises from the noted application of image elements.

An authentication image can include non-segmented and/or segmented image elements that are placed at or near a given print density (e.g., at or near a print density under 30%). In this way, the image elements can, when subjected to unauthorized duplication, disappear, distort, and/or exhibit a shift in color hue. In some embodiments the image elements can form one or more microimage, microdot, and/or microtext instances that are viewable under magnification in an authorized print (e.g., printed using a compensated print file).

Figure 11:
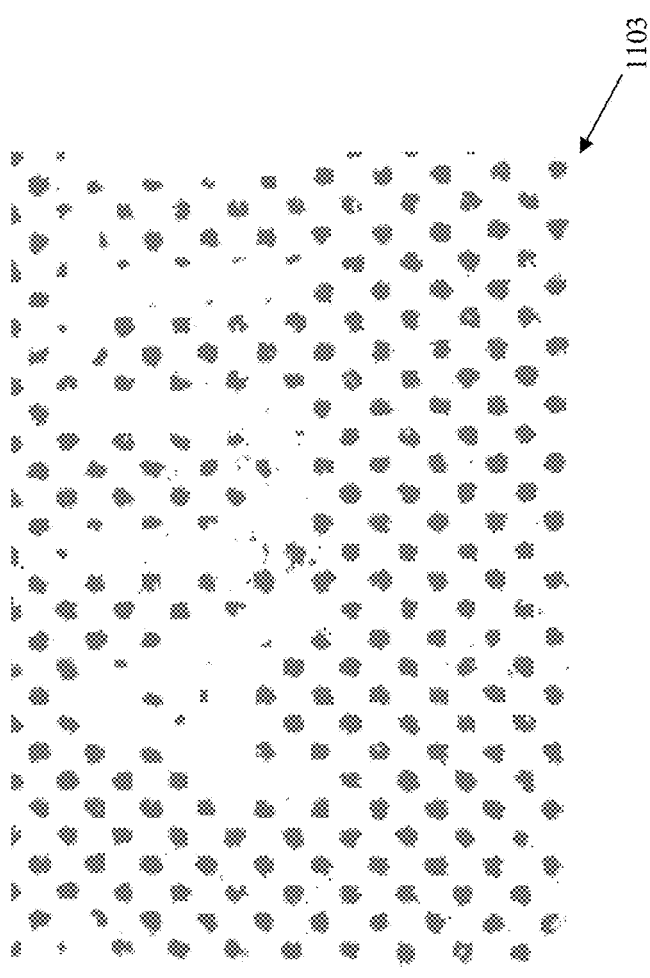
FIG. 11 is an illustration showing depictions of microtext, according to various embodiments.
Figure 11:
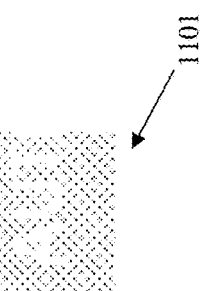

As an example, using this approach placed rows of dot image elements can form microtext (e.g., the letters "AUT" signifying an authenticated image). This microtext can change hue, distort, and/or disappear upon unauthorized copy or scanning. Turning FIG. 11, shown is a cropped view 1101 of an authorized print of microtext. Then, view 1103 shows a zoom of the authorized microtext print. Where an unauthorized copy is made, the microtext can disappear.

Also, an authentication image can include supplemental image elements. These supplemental image elements can be placed out of sync with the angulation of other image elements of the authentication image. Because unauthorized copying distorts image elements of an authentication image, such supplemental image elements can be distorted in an unauthorized copy. As just some examples, supplemental image elements can be situated with: a) latent images; b) background images; and/or c) characters. The noted out of sync placement of supplemental image elements can include turning, tipping, and/or twisting of image elements that exist elsewhere in in an authentication image. As an example, there can be only a single supplemental image element (e.g., within a latent images). As another example, there can be multiple supplemental image elements.

The use of supplemental image elements in an authentication image can provide for a covert means of authentication (e.g., by a user or by software analysis). In particular, information regarding a supplemental image element (e.g., the angle and/or location thereof) can be made available (e.g., stored on a server and/or otherwise available to a smartphone app). Using this information, the supplemental image element can be found in an authorized print. But, due to distortion the supplemental image element will not be locatable in an unauthorized print. In this way, search (e.g., by a smartphone app) for a supplemental image element can provide a covert means of authentication.

Figure 12:
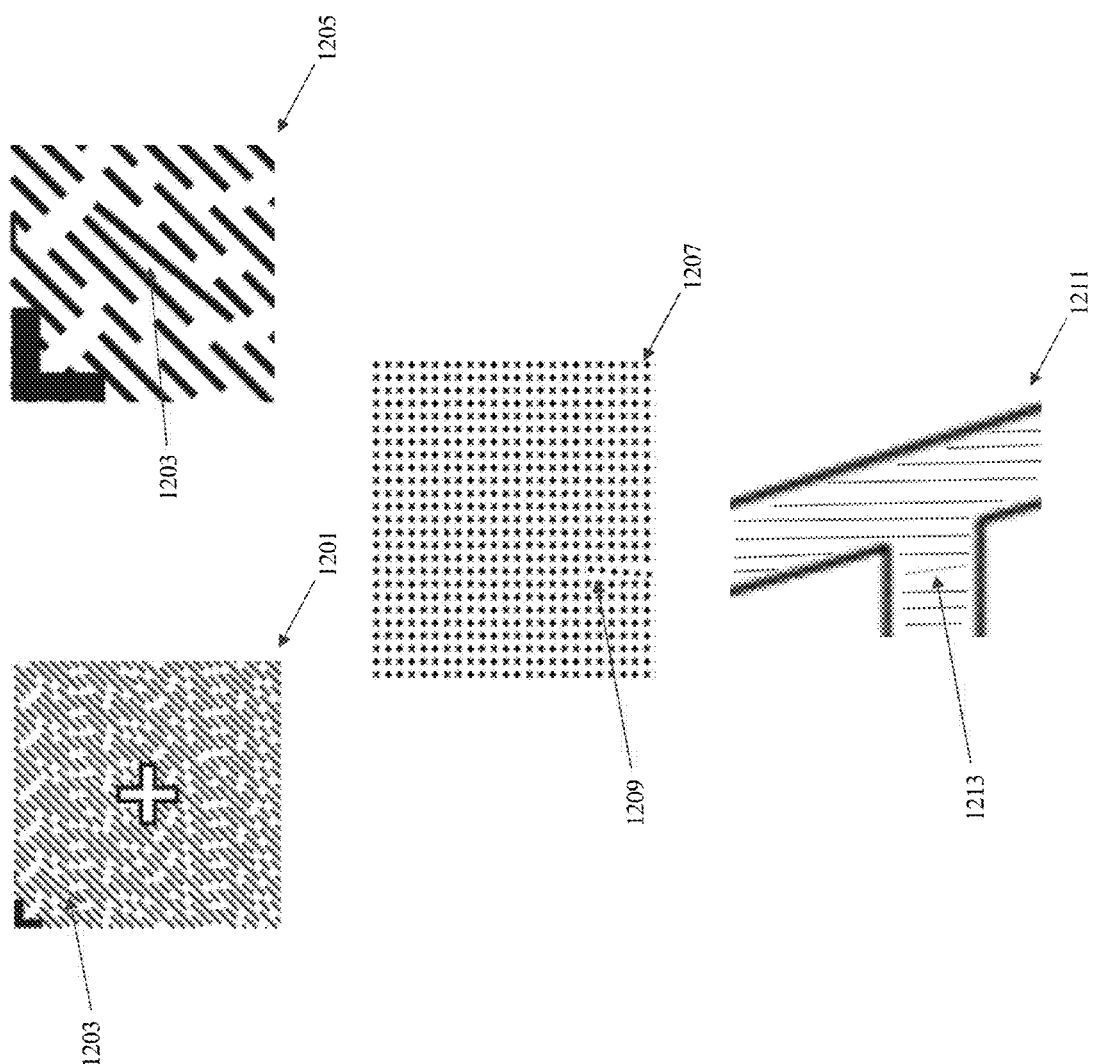
FIG. 12 is an illustration showing depictions of supplemental image elements, according to various embodiments.

Turning to FIG. 12, shown is an authentication image 1201 including a supplemental image element 1203. The supplemental image element 1203 is placed out of sync with the angulation of other image elements of authentication image 1201. Also shown in FIG. 12 is a corresponding zoom 1205. Turning further to FIG. 12, shown is a background image 1207 that includes supplemental image elements 1209. As depicted by the figure, supplemental image elements 1209 are placed out of sync with the angulation of other image elements of background image 1207. Also shown in FIG. 12 is a character 1211 that includes supplemental image element 1213. Supplemental image element 1213 is placed out of sync with the angulation of other image elements of character 1211.

A set of multiple image elements can be used to form a compound image element. An authentication image can include multiple compound image elements. Furthermore, those image elements that form a compound image element can be split into separate color layers for purposes of printing.

Figure 13:
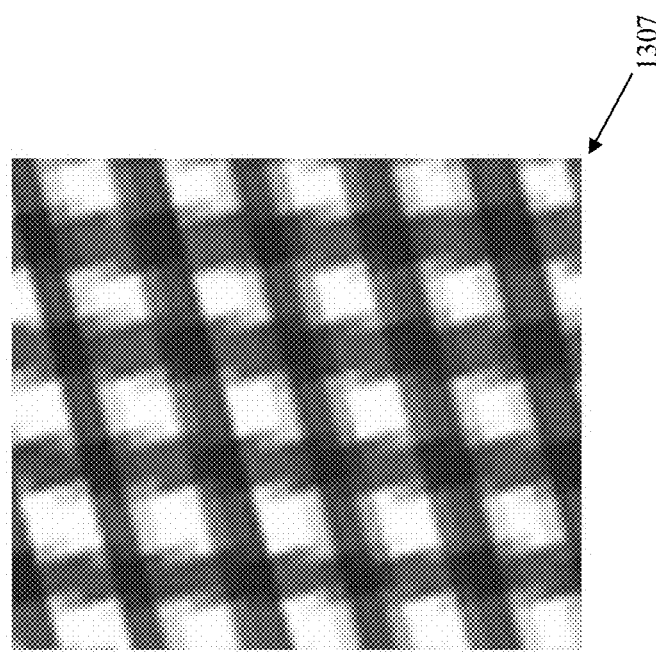
FIG. 13 is an illustration depicting compound image elements, according to various embodiments.
Figure 13:
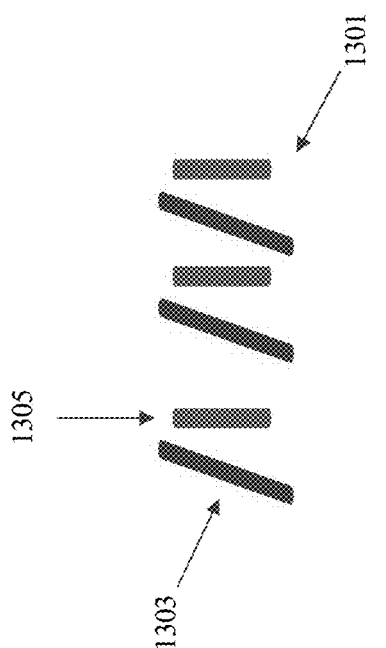
Figure 16:
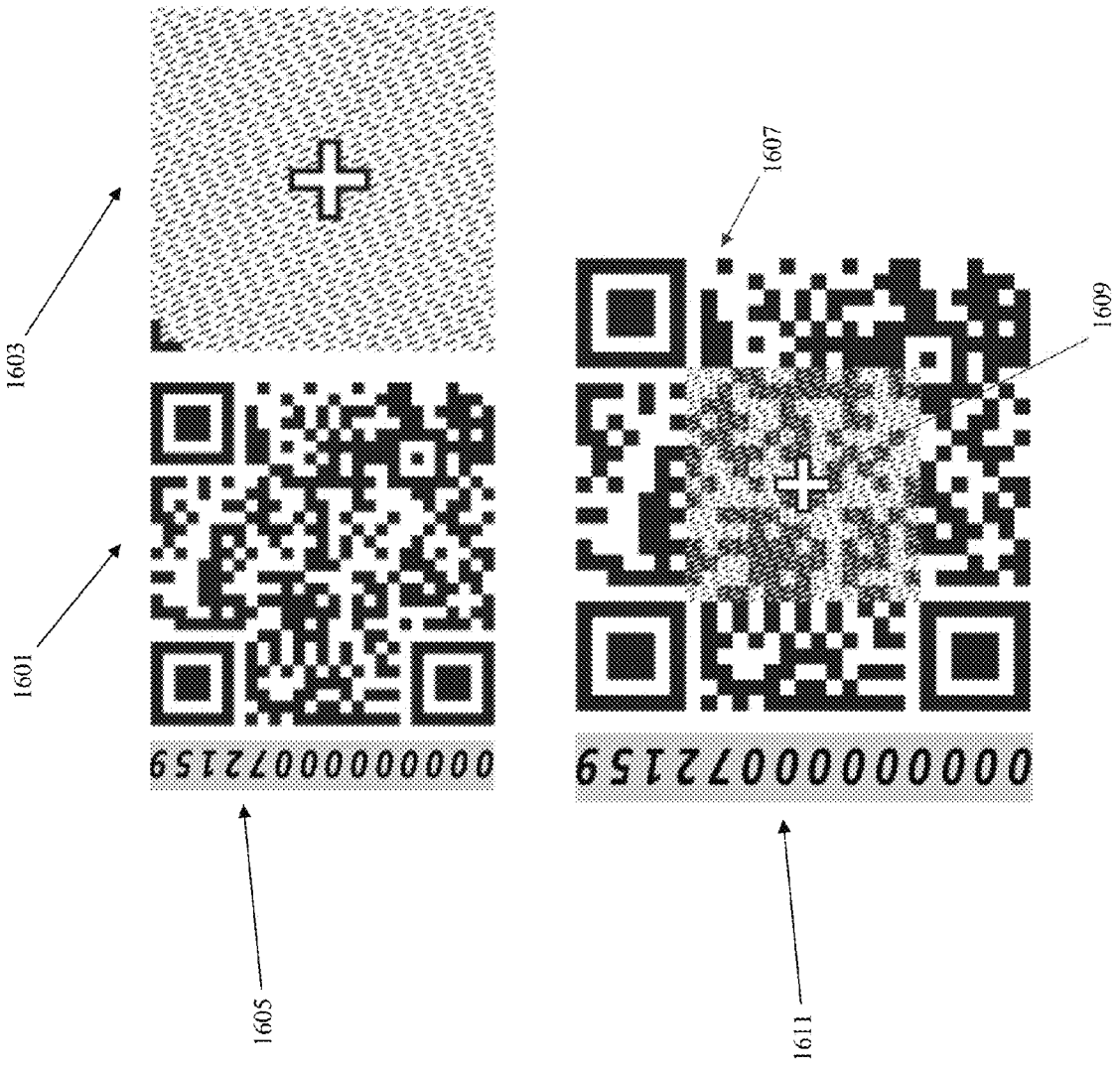
FIG. 16 is an illustration depicting QR codes along with authentication images, according to various embodiments.

The use of compound image elements in an authentication image can serve to inhibit unauthorized copying of that authentication image. In particular, home/office capture devices (e.g., scanners and smartphone cameras) typically capture colors individually, and partial loss of a compound image element occurs when capturing in a particular color. Also, home/office capture devices typically utilize a CMY-based approach. CMY-based approaches typically do not capture non-CMY images in their entirety. As such, where a compound image element is formed in a non-CMY fashion, such can serve to further inhibit unauthorized authentication image copying. Shown in FIG. 13 is an example compound image element 1301. The compound image element 1301 is made up of red color layer image elements 1303 and green color layer image elements 1305. Also shown in FIG. 16 is a zoom 1307 of an authentication image that incorporates instances of compound image element 1301.

Figure 14:
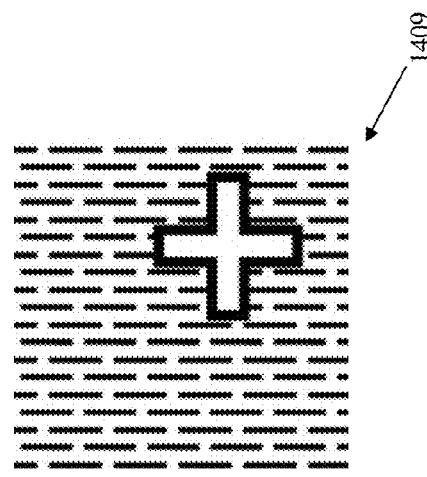
FIG. 14 is an illustration depicting visible targets, according to various embodiments.
Figure 14:
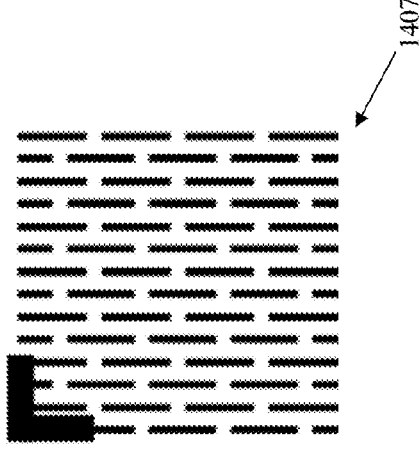
Figure 14:
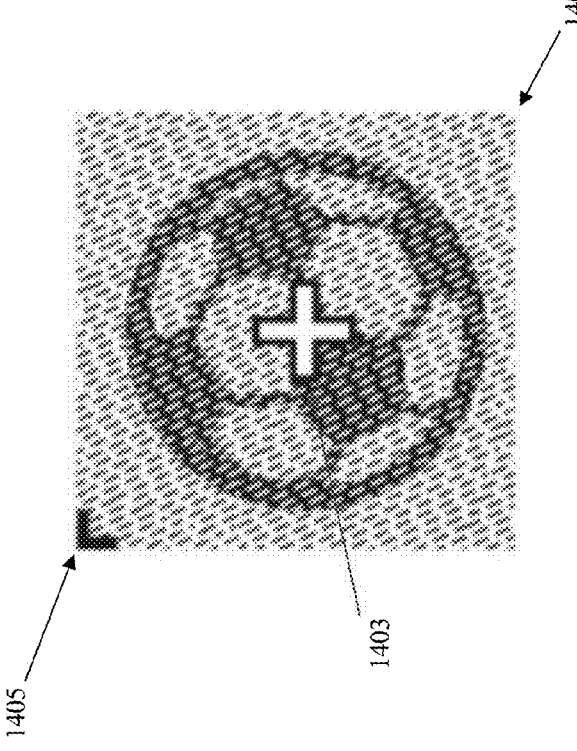

Turning to FIG. 14, it is noted that a visible target can exhibit discrete contrast, such as discrete contrast arising from the unprinted area of the visible target as outlined by the printed area of the visible target. Such discrete contrast can offer a smartphone (or other camera device) running authorized software a visual component to assist with auto-focus, such as when the capture device is in close proximity to an authentication image that includes the visible target. Shown in FIG. 14 is an authentication image 1401 including such visible targets in the form of: a) a visible target 1403 that is located in authentication image 1401 and centered therewith; and b) a visible target 1405 that is located in authentication image 1401 and at the upper left corner thereof. Then, zoom 1407 shows detail of visible target 1405, and zoom 1409 shows detail of visible target 1403.

Figure 15:
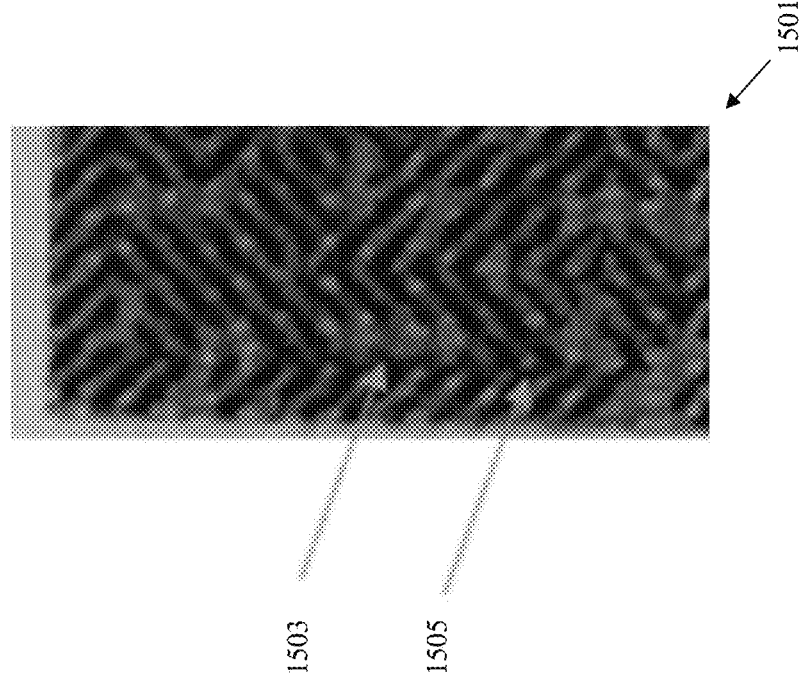
FIG. 15 is an illustration depicting an authentication image printed using a custom font/character set approach, according to various embodiments.

As discussed, printing an authentication image via a custom font/character set approach can allow for variability when creating the authentication image. Using such an approach (e.g., where a vector-based technique is used in creation of a custom font/character set) enables variable authentication images to be generated: a) using an existing data file; b) across a variety of low-resolution print devices; and c) across a variety of home/office imaging devices. Such an existing data file can include: a) a library of font characters; and/or b) a library of visible targets that are prerendered in place (pre-RIPed). Shown in FIG. 15 is a zoom 1501 of an example authentication image printed using the noted custom font/character set approach. In particular, within the authentication image compound image elements 1505 of a single color (depicted as cyan here) are placed over a colorized toned area 1503 of a different color (depicted as light magenta here).

An authentication image can be placed within or in the vicinity of (e.g., adjacent to) a track and trace element (e.g., a bar code, a QR code, a 2D code, or track and trace text). Alternatively or additionally, a track and trace element can be placed within an authentication image. The authentication image can be used in determining the authenticity of the track and trace element. The authentication image, after being validated, can allow access to the track and trace system via the track and trace element (e.g., barcode). Thus, if the authentication image is not valid, access is not allowed. In particular, where, for instance, the authentication image scans as valid with a phone app, the track and trace element can be considered proper. In some embodiments, further placed in the vicinity of the track and trace element can be a secondary track and trace numerical code.

As an example, image element width/spacing (and/or angle) can be consistent throughout the authentication image. As another example, image element width/spacing (and/or angle) can exhibit regular variability throughout the authentication image. In some embodiments, a smartphone app can decode such regular variability to one or more values (e.g., one or more spacing values). The smartphone app can use these one or more values to consult a server (or other source) that maps such values to secondary track and trace numerical codes. The smartphone app can then compare a determined secondary track and trace numerical code with a secondary track and trace numerical code placed in the vicinity of a track and trace element under consideration (e.g., a QR code under consideration). Where the comparison yields a match, the smartphone app (or other software) can consider the track and trace element under consideration to be proper. As an alternative, the smartphone app can present the determined secondary track and trace numerical code to a user.

Turning to FIG. 16, shown is a QR code 1601, along with an adjacent authentication image 1603, and a secondary track and trace numerical code 1605. Also shown in FIG. 16 is a QR code 1607, along with situated-therein authentication image 1609, and a secondary track and trace numerical code 1611.

Figure 17:
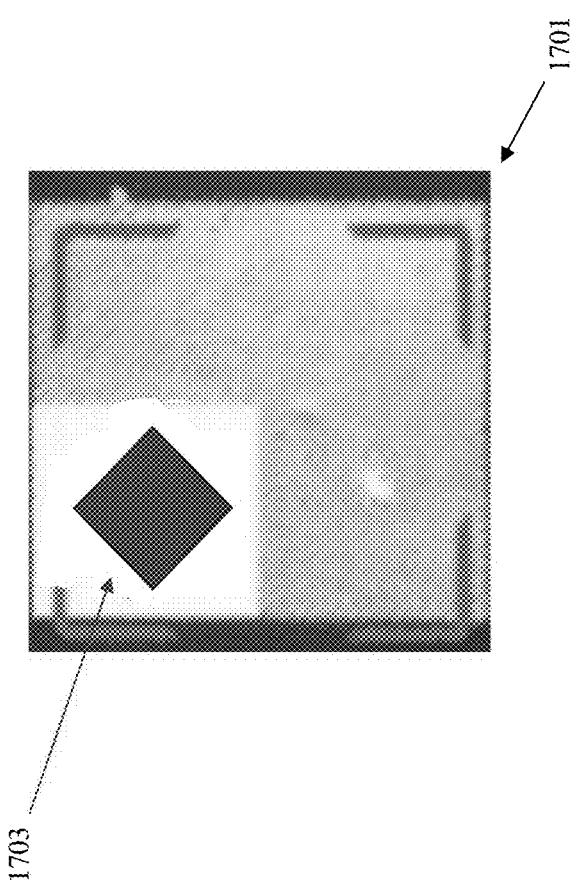
FIG. 17 is an illustration depicting an authentication image printed using invisible colorant, according to various embodiments.

Additionally, an authentication image can be formulated such that certain portions thereof are printed using a colorant invisible under regular light, while other portions thereof are printed using a colorant that is visible under regular light. Portions can be latent images and/or compound image elements. Such colorant invisible under regular light can be ultraviolet or infrared colorant. As an illustration, with reference to FIG. 17 an authentication image 1701 can include one latent image 1703 printed using invisible colorant, and three latent images printed using visible colorant (not shown). Continuing with the illustration, an authentication image of this sort can provide for both consumer user and investigator user functionality within a single authentication image. In particular, the consumer user can present (e.g., for validity determination using smartphone app) the authentication image under regular light. Under such regular light, the three latent images printed using visible colorant can be exposed. Further, the investigator user can present the authentication image under, say, a blacklight. In this way, the investigator user can have access to all four latent images.

Through the use of such approaches, various benefits can accrue. Continuing with the illustration, the regular light invisibility of the fourth latent image can lead to it remaining undetected by a consumer user, thereby impeding attempts by the consumer user to make an unauthorized copy of the authentication image. As another example, the inclusion of a latent image typically only accessible to investigator users can help assure investigator users of authentication image validity.

Further to printing an authentication image using a low-resolution print device, an authentication image can be created using laser ablation, and/or laser engraving/etching approaches. Such laser ablation approaches can include firstly printing a solid area with black colorant. Subsequently the solid area can be ablated by a laser so as to yield an authentication image. Such laser engraving/etching approaches can include firstly printing a solid area with white or clear colorant. Subsequently the solid area can be engraved/etched by a laser so as to yield an authentication image. Further, these ablation and/or engraving/etching approaches can include generating one or more uncompensated and/or compensated print files in agreement with that which is discussed above (e.g., taking into account ablation and/or engraving/etching device inadequacies and/or idiosyncrasies). In this way a laser ablation and/or engraving/etching can provide an authentication image that on one hand stays clean enough to scan (and/or consistently scan) as valid, but on the other hand if subjected to unauthorized duplication attempts yields an authentication image that fails to scan (and/or consistently scan) as valid.

Figure 18:
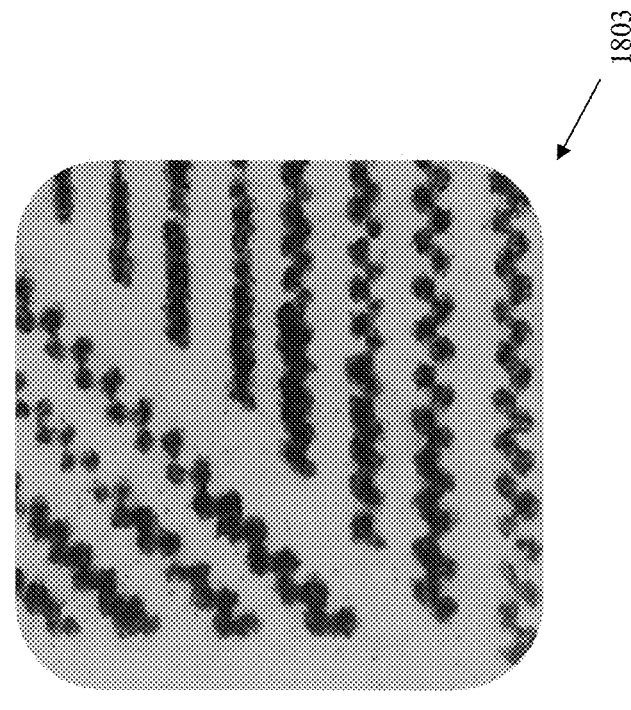
FIG. 18 is an illustration depicting usage of a laser ablation approach, according to various embodiments.
Figure 18:
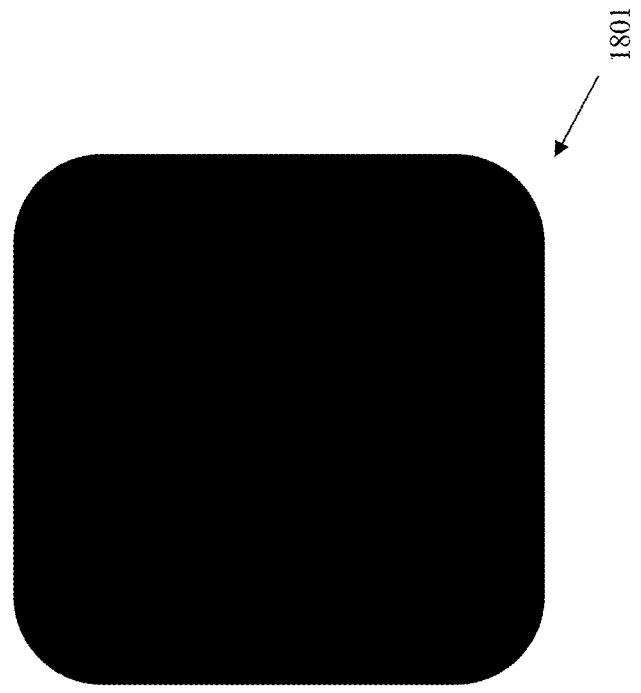

Also, an authentication image can be generated using both colorant (e.g., as printed by a low-resolution print device) and laser ablation and/or engraving/etching. Here, certain image elements of the authentication image can be formed using colorant, and other image elements of the authentication image can be formed via laser. Where both colorant and laser approaches are used, a certain portion (e.g., 50%) of image elements can be generated using the colorant approach, and a certain portion (e.g., 50%) of image elements can be generated using the laser approach. Further the colorant-generated image elements can be consistent and/or variable. Likewise, the laser-generated image elements can be consistent and/or variable. As such, as just an illustration, an authentication image can be generated wherein m % (e.g., m=50%) of the image elements thereof are colorant-generated and consistent, and n % (e.g., n=50%) of the image elements thereof are laser-generated and variable. As just another illustration, an authentication image can be generated wherein m % (e.g., m=50%) of the image elements thereof are colorant-generated and variable, and n % (e.g., n=50%) of the image elements thereof are laser-generated and consistent. In various embodiments where both colorant and laser approaches are used in authentication image generation, a Datalase/SUNlase process can be employed. Turning to FIG. 18, depicted is an example of the discussed laser ablation approach. Firstly, a solid area 1801 can be printed using a black colorant. Afterwards the solid area 1801 can be laser engraved/etched so as to yield an authentication image 1803.

Further to generating an authentication image using a printer, or using or laser ablation or engraving/etching, an onscreen authentication image can be created. A smartphone (or other capture device) can be pointed at a display showing such an onscreen authentication image, and a validity determination can be made for the onscreen authentication image.

Devices on which onscreen authentication images can be displayed for validity determination purposes include laptop/desktop screens, television screens, smartphone (or other mobile/smart device) screens, and barcode scanner screens. As just an illustration, an onscreen authentication image can be displayed on a first smartphone, and a second smartphone can be pointed at the display of the first smartphone.

Generation of an onscreen authentication image can, in a manner analogous to that which is discussed above, include generating one or more uncompensated and/or compensated virtual (e.g., pdf) print files. The generation of these virtual files can take into account display device inadequacies and/or idiosyncrasies. As such, there can be generation of an onscreen authentication image that on one hand stays clean enough to scan (and/or consistently scan) as valid, but on the other hand if subjected to unauthorized duplication attempts yields an authentication image that fails to scan (and/or consistently scan) as valid. As just some examples, like an authentication image generated using print and/or ablation and/or engraving/etching approaches, an onscreen authentication image can be used as a printing plate quality control (QC) image, for printed image on-press, and/or for products undergoing a customs, distribution, brand check, and/or retail environment inspection.

Figure 19:
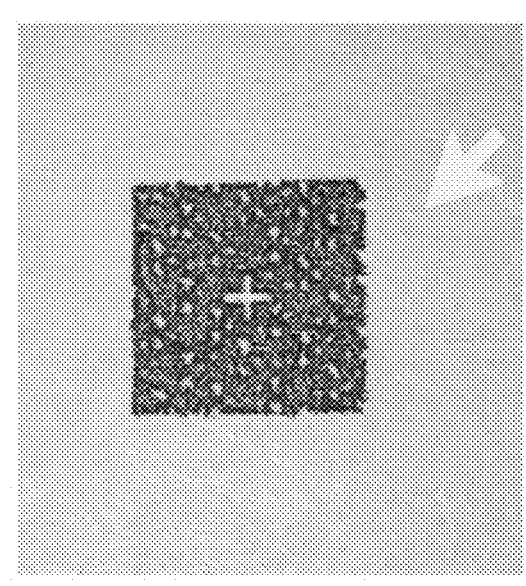
FIG. 19 is an illustration depicting onscreen authentication images, according to various embodiments.
Figure 19:
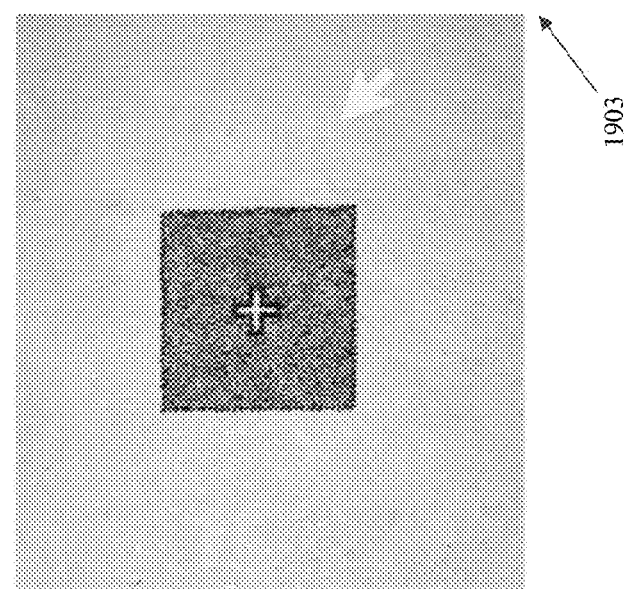
Figure 19:
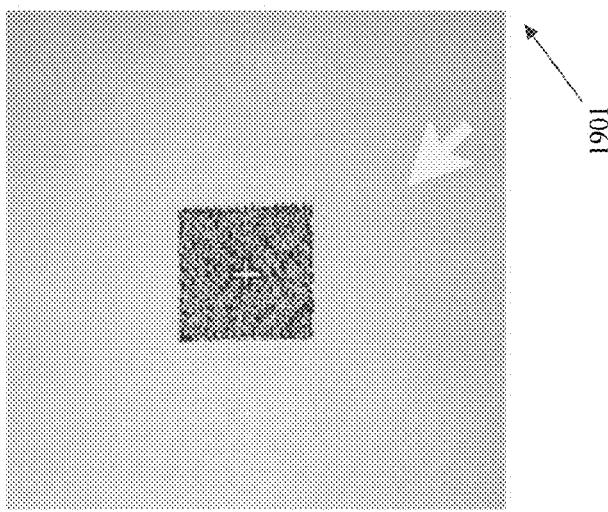

Turning to FIG. 19, shown are a depiction 1901 of a first example onscreen authentication image being displayed on a smartphone screen, and a depiction 1903 of the first example onscreen authentication image being displayed on a laptop/desktop screen. Also shown in FIG. 19 is a depiction 1905 of a second example onscreen authentication image.

Moreover, authentication images generated using print and/or ablation and/or engraving/etching approaches can be used in conjunction with onscreen authentication images. As just an illustration, there can be call that a user use a smartphone to scan as valid both: a) an authentication image generated using print, and/or ablation and/or engraving/etching approaches; and b) an onscreen authentication image. Further according to this illustration, the user can proceed in this way in order to make an authenticity determination of a sports memorabilia item. Here, for instance, the authentication image generated using print and/or ablation and/or engraving/etching approaches can be attached to the memorabilia item, and the onscreen authentication image can be provided to the user via a text message (or via a website to which the user is directed).

Figure 20:
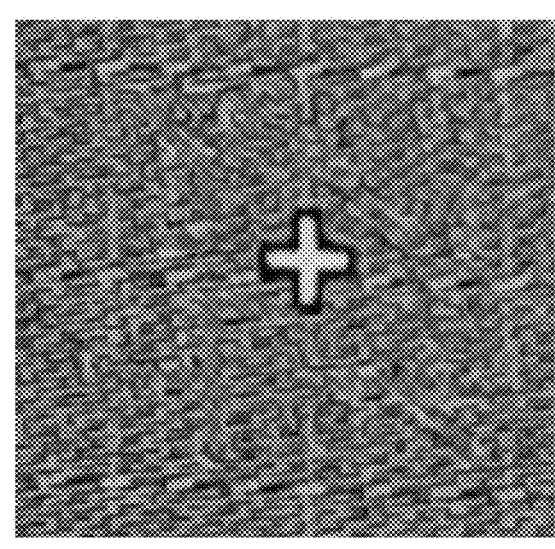
FIG. 20 is an illustration depicting an onscreen authentication image, and authentication images generated using print and/or laser, according to various embodiments.
Figure 20:
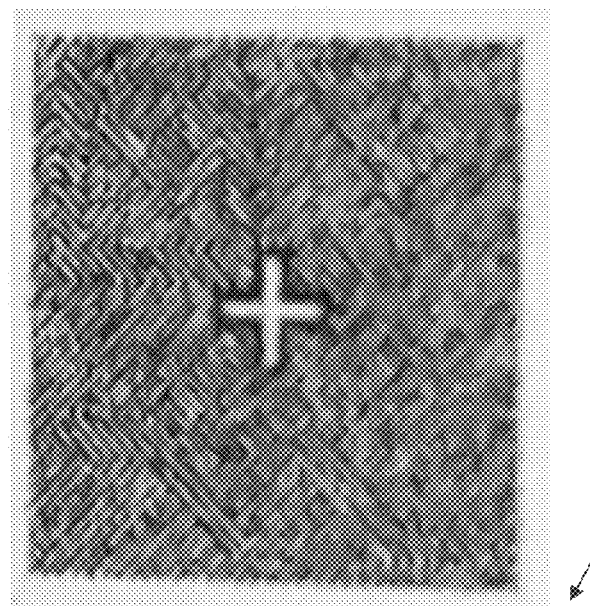
Figure 20:
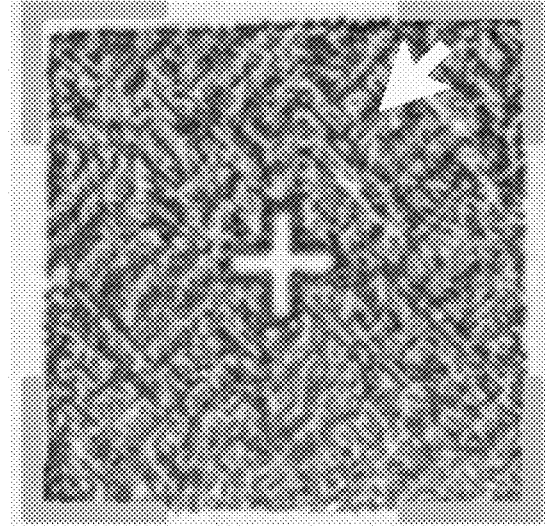
Figure 20:

Turning to FIG. 20, shown are: a) a depiction 2001 of an example onscreen authentication image; b) a first example authentication image generated using print and/or ablation and/or engraving/etching approaches 2003; and c) a second example authentication image generated using print and/or ablation and/or engraving/etching approaches 2005.

Hardware and Software

According to various embodiments, various functionality discussed herein can be performed by and/or with the help of one or more computers. Such a computer can be and/or incorporate, as just some examples, a personal computer, a server, a smartphone, a system-on-a-chip, and/or a microcontroller. Such a computer can, in various embodiments, run Linux, MacOS, Windows, or another operating system.

Figure 21:
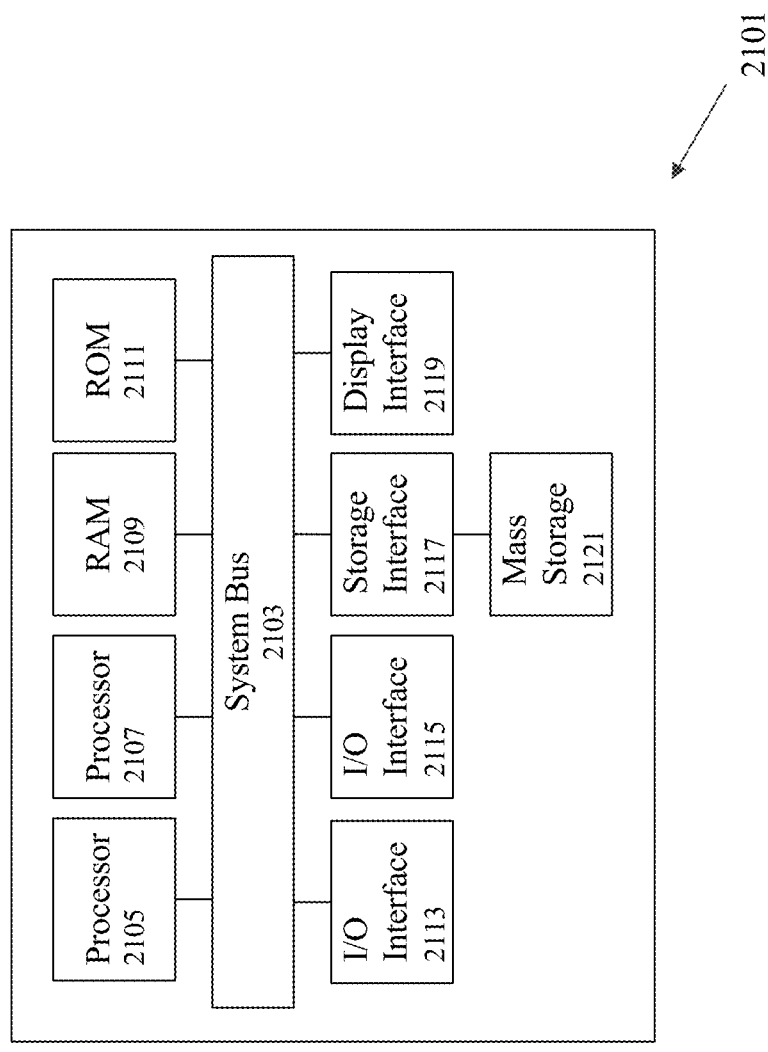
FIG. 21 shows an example computer, according to various embodiments.

Such a computer can also be and/or incorporate one or more processors operatively connected to one or more memory or storage units, wherein the memory or storage may contain data, algorithms, and/or program code, and the processor or processors may execute the program code and/or manipulate the program code, data, and/or algorithms. Shown in FIG. 21 is an example computer employable in various embodiments of the present invention. Example computer 2101 includes system bus 2103 which operatively connects two processors 2105 and 2107, random access memory (RAM) 2109, read-only memory (ROM) 2111, input output (I/O) interfaces 2113 and 2115, storage interface 2117, and display interface 2119. Storage interface 2117 in turn connects to mass storage 2121. Each of I/O interfaces 2113 and 2115 can, as just some examples, be a Universal Serial Bus (USB), a Thunderbolt, an Ethernet, a Bluetooth, a Long Term Evolution (LTE), a 5G, an IEEE 488, and/or other interface. Mass storage 2121 can be a flash drive, a hard drive, an optical drive, or a memory chip, as just some possibilities. Processors 2105 and 2107 can each be, as just some examples, a commonly known processor such as an ARM-based or x86-based processor. Computer 2101 can, in various embodiments, include or be connected to a touch screen, a mouse, and/or a keyboard. Computer 2101 can additionally include or be attached to card readers, DVD drives, floppy disk drives, hard drives, memory cards, ROM, and/or the like whereby media containing program code (e.g., for performing various operations and/or the like described herein) may be inserted for the purpose of loading the code onto the computer.

In accordance with various embodiments of the present invention, a computer may run one or more software modules designed to perform one or more of the above-described operations. Such modules can, for example, be programmed using Python, Java, JavaScript, Swift, C, C++, C#, and/or another language. Corresponding program code can be placed on media such as, for example, DVD, CD-ROM, memory card, and/or floppy disk. It is noted that any indicated division of operations among particular software modules is for purposes of illustration, and that alternate divisions of operation may be employed. Accordingly, any operations indicated as being performed by one software module can instead be performed by a plurality of software modules. Similarly, any operations indicated as being performed by a plurality of modules can instead be performed by a single module. It is noted that operations indicated as being performed by a particular computer can instead be performed by a plurality of computers. It is further noted that, in various embodiments, peer-to-peer and/or grid computing techniques may be employed. It is additionally noted that, in various embodiments, remote communication among software modules may occur. Such remote communication can, for example, involve JavaScript Object Notation-Remote Procedure Call (JSON-RPC), Simple Object Access Protocol (SOAP), Java Messaging Service (JMS), Remote Method Invocation (RMI), Remote Procedure Call (RPC), sockets, and/or pipes.

Moreover, in various embodiments the functionality discussed herein can be implemented using special-purpose circuitry, such as via one or more integrated circuits, Application Specific Integrated Circuits (ASICs), or Field Programmable Gate Arrays (FPGAs). A Hardware Description Language (HDL) can, in various embodiments, be employed in instantiating the functionality discussed herein. Such an HDL can, as just some examples, be Verilog or Very High Speed Integrated Circuit Hardware Description Language (VHDL). More generally, various embodiments can be implemented using hardwired circuitry without or without software instructions. As such, the functionality discussed herein is limited neither to any specific combination of hardware circuitry and software, nor to any particular source for the instructions executed by the data processing system.

The invention claimed is:

1. An authentication image, comprising:
one or more latent images, wherein the latent images indicate authenticity; and
one or more background images, wherein the background images work in conjunction with the latent images to inhibit unauthorized duplication of the authentication image,
wherein generation of the authentication image utilizes knowledge of idiosyncrasies of one or more of low-resolution print devices or home/office equipment such that the authentication image scans as valid; and
wherein authorized software uses knowledge regarding the background images and knowledge regarding the latent images to yield one or more of the latent images from the authentication image.

2. The authentication image of claim 1, further comprising one or more visible targets, wherein the visible targets aid in said yielding of the latent images from the authentication image.

3. The authentication image of claim 2, wherein the visible targets assist in one or more of glare detection or automatic zooming.

4. The authentication image of claim 2, wherein the visible targets are one or more of in or adjacent to the authentication image.

5. The authentication image of claim 2, wherein detection of the one or more visible targets utilizes contour extraction.

6. The authentication image of claim 1, wherein one or more of the latent images or the background images are formulated using image elements.

7. The authentication image of claim 6, wherein the image elements include one or more of lines, line segments, dots, spots, or non-imaged areas.

8. The authentication image of claim 6, wherein a first quantity of the image elements are arranged at a first angle and form the one or more background images, and wherein a second quantity of the image elements are arranged at or near a second angle and form the one or more latent images.

9. The authentication image of claim 1, wherein the authentication image is printed via a custom font/character set approach.

10. The authentication image of claim 1, wherein the authentication image is associated with a track and trace element, and wherein the authentication image denotes authenticity of the track and trace element.

11. The authentication image of claim 1, wherein the authentication image is an onscreen authentication image, and wherein a validity determination can be made by pointing a device at a display showing the onscreen authentication image.

12. The authentication image of claim 1, wherein the authentication image is an onscreen authentication image, wherein the onscreen authentication image is accompanied by a further authentication image, wherein the further authentication image is formed via one of print, ablation, engraving, or etching, and wherein a validity determination can be made by pointing a device at the further authentication image, and at a display showing the onscreen authentication image.

13. A system, comprising:
at least one processor; and
a memory storing instructions that, when executed by the at least one processor, cause the system to generate the authentication image of claim 1.

14. A computer-implemented method, comprising:
generating, by a computing system, an uncompensated print file for an authentication image, wherein printing of the uncompensated print file by a low-resolution print device yields a print result not matching the uncompensated print file; and generating, by the computing system, from the uncompensated print file, a compensated print file for the authentication image, wherein the generation of the compensated print file utilizes known low-resolution print device idiosyncrasies, and wherein printing of the compensated print file by the low-resolution print device yields an authentication image print result that scans as valid.

15. The computer-implemented method of claim 14, wherein unauthorized duplication of the authentication image print result incurs image loss.

16. The computer-implemented method of claim 14, wherein an unauthorized duplicate of the authentication image print result fails to scan as valid.

17. The computer-implemented method of claim 14, wherein the authentication image is formulated using consistent or variable image elements.

18. The computer-implemented method of claim 14, wherein the generation of the compensated print file utilizes one or more compensatory formulas.

19. The computer-implemented method of claim 14, wherein the compensated print file is generated using a custom font/character set approach.

20. The computer-implemented method of claim 14, wherein the authentication image is formulated using image elements having a print density that results in one or more of disappearance, distortion, or color hue shift where the authentication image is subjected to unauthorized duplication.

21. The computer-implemented method of claim 14, wherein the authentication image is formulated using one or more compound image elements, and wherein the compound image elements are split into separate color layers.

22. The computer-implemented method of claim 14, wherein first portions of the authentication image are printed using a colorant invisible under regular light, and second portions of the authentication image are printed using a colorant visible under regular light.

23. A system comprising:

at least one processor; and a memory storing instructions that, when executed by the at least one processor, cause the system to perform the computer-implemented method of claim 14.

* * * * *